US012327942B2

(12) United States Patent
Yamauchi et al.

(10) Patent No.: US 12,327,942 B2
(45) Date of Patent: Jun. 10, 2025

(54) CONNECTOR AND CONNECTION UNIT FOR USE IN AN ELECTRICAL DEVICE

(71) Applicant: I-PEX Inc., Kyoto (JP)

(72) Inventors: Takao Yamauchi, Machida (JP); Sho Suzuki, Machida (JP); Kenta Tanaka, Machida (JP)

(73) Assignee: I-PEX Inc., Kyoto (JP)

( * ) Notice: Subject to any disclaimer, the term of this patent is extended or adjusted under 35 U.S.C. 154(b) by 354 days.

(21) Appl. No.: 17/789,485

(22) PCT Filed: Dec. 28, 2020

(86) PCT No.: PCT/JP2020/049189

§ 371 (c)(1), (2) Date: Jun. 27, 2022

(87) PCT Pub. No.: WO2021/132721

PCT Pub. Date: Jul. 1, 2021

(65) Prior Publication Data

US 2023/0030519 A1 Feb. 2, 2023

(30) Foreign Application Priority Data

Dec. 28, 2019 (JP) ................................ 2019-239999

(51) Int. Cl.
*H01R 12/71* (2011.01)
*H01R 12/72* (2011.01)
(Continued)

(52) U.S. Cl.
CPC ........... *H01R 12/716* (2013.01); *H01R 12/72* (2013.01); *H01R 13/629* (2013.01); *H01R 13/6588* (2013.01)

(58) Field of Classification Search
CPC .. H01R 13/629; H01R 13/6588; H01R 12/72; H01R 12/714; H01R 12/716
See application file for complete search history.

(56) References Cited

U.S. PATENT DOCUMENTS 7,484,969 B2 * 2/2009 Shiu .................... H01R 12/716 439/74
9,478,902 B2 * 10/2016 Komoto .............. H01R 12/716
(Continued)

FOREIGN PATENT DOCUMENTS

EP 3 051 634 A1 8/2016
JP 2006-085944 A 3/2006
(Continued)

OTHER PUBLICATIONS

Taiwan Office Action dated Jun. 7, 2024 issued for the corresponding Taiwan Patent Application No. 113116510 with English Translation.

*Primary Examiner* — Marcus E Harcum
(74) *Attorney, Agent, or Firm* — Howard & Howard Attorneys PLLC

(57) ABSTRACT

A connector (10) includes a set of type 1 contacts (4A) disposed in a type 1 holding area, the type 1 contacts (4A) being disposed facing each other, and a type 2 contact (4B) disposed in each of two type 2 holding areas sandwiching the type 1 holding area. When viewed from above, at least a portion of the type 2 contact (4B) is disposed in a range obtained by extending, in a first direction in which the type 1 holding area and the two type 2 holding areas are arranged, a region in which the set of type 1 contacts (4A) oppose each other in a second direction orthogonal to the first direction. Additionally, the type 2 contact (4B) includes a connecting portion that is connected to the circuit of the circuit board, and a contacting portion that is disposed at a position separated, from the connecting portion in a normal direction of an installation surface to the circuit board, and that contacts a terminal of a mating connector.

26 Claims, 24 Drawing Sheets

(51) Int. Cl.
*H01R 13/629* (2006.01)
*H01R 13/6588* (2011.01)

(56) References Cited

U.S. PATENT DOCUMENTS

| | | | | |
|---|---|---|---|---|
| 10,312,637 | B2 * | 6/2019 | Chuang | H01R 13/6585 |
| 10,516,228 | B2 * | 12/2019 | Takenaga | H01R 12/716 |
| 10,700,458 | B2 * | 6/2020 | Hirakawa | H01R 13/64 |
| 10,734,741 | B2 * | 8/2020 | Yukutake | H01R 13/6594 |
| 10,819,052 | B2 * | 10/2020 | Ueda | H01R 13/50 |
| 11,532,904 | B2 * | 12/2022 | Amemori | H01R 12/716 |
| 2013/0012039 | A1 * | 1/2013 | Nose | H01R 12/73 439/74 |
| 2013/0323971 | A1 * | 12/2013 | Kimura | H01R 13/6485 439/607.22 |
| 2016/0049744 | A1 * | 2/2016 | Miyazaki | H01R 12/712 439/626 |
| 2017/0271813 | A1 * | 9/2017 | Ge | H01R 13/504 |
| 2018/0323527 | A1 | 11/2018 | Ueda et al. | |
| 2018/0342823 | A1 * | 11/2018 | Chen | H01R 12/7005 |
| 2020/0244011 | A1 * | 7/2020 | Kitazawa | H01R 13/6585 |
| 2021/0005993 | A1 * | 1/2021 | Yanase | H01R 13/193 |
| 2021/0143586 | A1 * | 5/2021 | Ishida | H01R 13/6585 |
| 2021/0175649 | A1 | 6/2021 | Amemori et al. | |
| 2021/0175665 | A1 * | 6/2021 | Someya | H01R 13/405 |
| 2021/0359443 | A1 * | 11/2021 | Mamuro | H01R 13/6471 |

FOREIGN PATENT DOCUMENTS

| | | | |
|---|---|---|---|
| JP | 2017-033699 | A | 2/2017 |
| TW | 202010200 | A | 3/2020 |
| WO | 2015/045623 | A1 | 4/2015 |
| WO | 2017/053149 | A1 | 3/2017 |
| WO | 2017/134719 | A1 | 8/2017 |

* cited by examiner

CONNECTOR AND CONNECTION UNIT FOR USE IN AN ELECTRICAL DEVICE

CROSS-REFERENCE TO RELATED APPLICATIONS

This application is a national phase application of International Patent Application No. PCT/JP2020/049189, filed Dec. 28, 2020, which claims priority to JP Patent Application No. 2019-239999, filed Dec. 28, 2019, the disclosures of which are hereby incorporated by reference in their entirety.

TECHNICAL FIELD

The present disclosure relates to a connector and a connector unit.

BACKGROUND ART

Patent Literature 1 describes a board-to-board connection connector that is used in the transmission of high-frequency signals and the like.

CITATION LIST

Patent Literature

Patent Literature 1: International Publication No. WO 2015/045623

SUMMARY OF INVENTION

Technical Problem

The connector described in Patent Literature 1 can mounted on a board with the orientation of the connector reversed 180° on a plane parallel to the board (hereinafter referred to as "reverse mounting"). However, in this connector, a plurality of contacts are adjacent to each other and fixed to a housing, which is a problem from the perspective of noise suppression. Specifically, inside the connector, electromagnetic waves (noise) generated when a signal flows to one contact may affect the other contacts adjacent to the one contact and cause so-called crosstalk.

The present disclosure is made with the view of the above situation, and an objective of the present disclosure is to provide a connector and a connector unit capable of the realization of reverse mounting and noise suppression in a well balanced manner.

Solution to Problem

A connector according to a first aspect of the present disclosure that achieves the objective described above is a connector that is installed on a circuit board and that is electrically connected to a circuit of the circuit board, the connector including:

a set of type 1 contacts that is disposed in a type 1 holding area, the type 1 contacts being disposed facing each other; and a type 2 contact that is disposed in each of two type 2 holding areas that sandwich the type 1 holding area, wherein when viewed from above, at least a portion of each of the type 2 contact is disposed in a range obtained by extending, in a first direction in which the type 1 holding area and the two type 2 holding areas are arranged, a region in which the set of type 1 contacts oppose each other in a second direction orthogonal to the first direction, and each of the type 2 contact includes a connecting portion that is connected to the circuit of the circuit board, and a contacting portion that is disposed at a position separated from the connecting portion in a normal direction of an installation surface to the circuit board, and that contacts a terminal of a mating connector.

The type 2 contact may be a contact that transmits a signal of a higher frequency than a signal that the type 1 contacts transmit.

When viewed from above, all of the type 1 contacts and all of the type 2 contacts may be disposed having point symmetry with respect to one predetermined point.

The one predetermined point may be disposed inward of an outer edge of the type 1 holding area.

The contacting portion may be disposed in the second direction with line symmetry, having an extended line of a center line of the set of type 1 contacts as an axis of symmetry.

One of the type 2 contact may be disposed in each of the type 2 holding areas, and when viewed from above, may be disposed on an extended line of a center line of the set of type 1 contacts that oppose each other in the second direction.

One of the type 2 contact may be disposed in each of the type 2 holding areas, and when viewed from above, the connecting portion of each of the type 2 contact may be disposed on an extended line of a center line between one type 1 contact of the set of type 1 contacts and the other type 1 contact of the set of type 1 contacts that oppose each other in the second direction.

The connecting portion of each of the type 2 contact may be formed along the first direction from a base of the contacting portion.

The connector may further include:

at least another set of type 1 contacts that is disposed in the type 1 holding area, and the type 1 contacts being disposed facing each other, wherein one type 1 contact of the set of type 1 contacts may be disposed on a same straight line arranged along the first direction as one type 1 contact of the other set of type 1 contacts.

The type 1 holding area and the two type 2 holding areas sandwiching the type 1 holding area may be partitioned by a space formed between a type 1 contact holder that holds the type 1 contacts and a type 2 contact holder that holds the type 2 contact.

Each of the type 1 contacts may include a connecting portion that is connected to the circuit of the circuit board, a contacting portion that is disposed at a position separated, from the connecting portion in the normal direction of the installation surface, and that contacts the terminal of the mating connector, and a coupling portion that couples the connecting portion and the contacting portion, and a plurality of the type 1 contacts may be disposed such that coupling directions of the contacting portion and the connecting portion by the coupling portion are arranged in a same direction.

Each of the type 1 holding area and the type 2 holding areas may include a raised holding portion that extends along a same direction and projects from a base toward the mating connector, and in each of the type 1 holding area and the type 2 holding areas, the contacting portion of the corresponding contact may be exposed to a side surface of the raised holding portion.

Each of the type 1 holding area and the type 2 holding areas may include an accommodation groove extending in a same direction, and in each of the type 1 holding area and the type 2 holding areas, contacting portions of all contacts may be disposed so as to be exposed by the accommodation groove.

A plurality of engaged portions with which the type 2 contact engages may be provided.

The connecting portion of the type 2 contact may include a hole that enables visual confirmation of a connection state between the circuit board and the connecting portion.

A projection may be provided on the installation surface in the connecting portion of the type 2 contact.

A connector unit according to a second aspect of the present disclosure that achieves the objective described above is a connector unit including a connector that is installed on a first circuit board and that is electrically connected to a circuit of the first circuit board; and a mating connector that is installed on a second circuit board, is electrically connected to a circuit of the second circuit board, and is electrically connected to the connector, wherein the connector includes a plurality of sets of type 1 contacts disposed in a type 1 holding area, the type 1 contacts being disposed facing each other, and a type 2 contact disposed in each of the two type 2 holding areas sandwiching the type 1 holding area, when viewed from above, at least a portion of each of the type 2 contact is disposed in a range obtained by extending, in a first direction in which the type 1 holding area and the two type 2 holding areas are arranged, a region in which the plurality of sets of type 1 contacts oppose each other in a second direction orthogonal to the first direction, and the type 2 contact includes a first connecting portion that is connected to the circuit of the first circuit board, and a first contacting portion that is disposed at a position separated, from the first connecting portion in a normal direction of a disposal surface to the first circuit board, and that contacts a terminal of the mating connector, and the mating connector includes a first contact that contacts the type 1 contacts and a second contact that contacts the type 2 contact, the second contact including a second connecting portion connected to the second circuit board and a second contacting portion disposed at a position separated, from the second connecting portion in a normal direction of an installation surface to the second circuit board and contacting a terminal of the connector.

Advantageous Effects of Invention

According to the present disclosure, both the realization of reverse mounting and noise suppression can be achieved in a well balanced manner.

DESCRIPTION OF EMBODIMENTS

Figure 1:
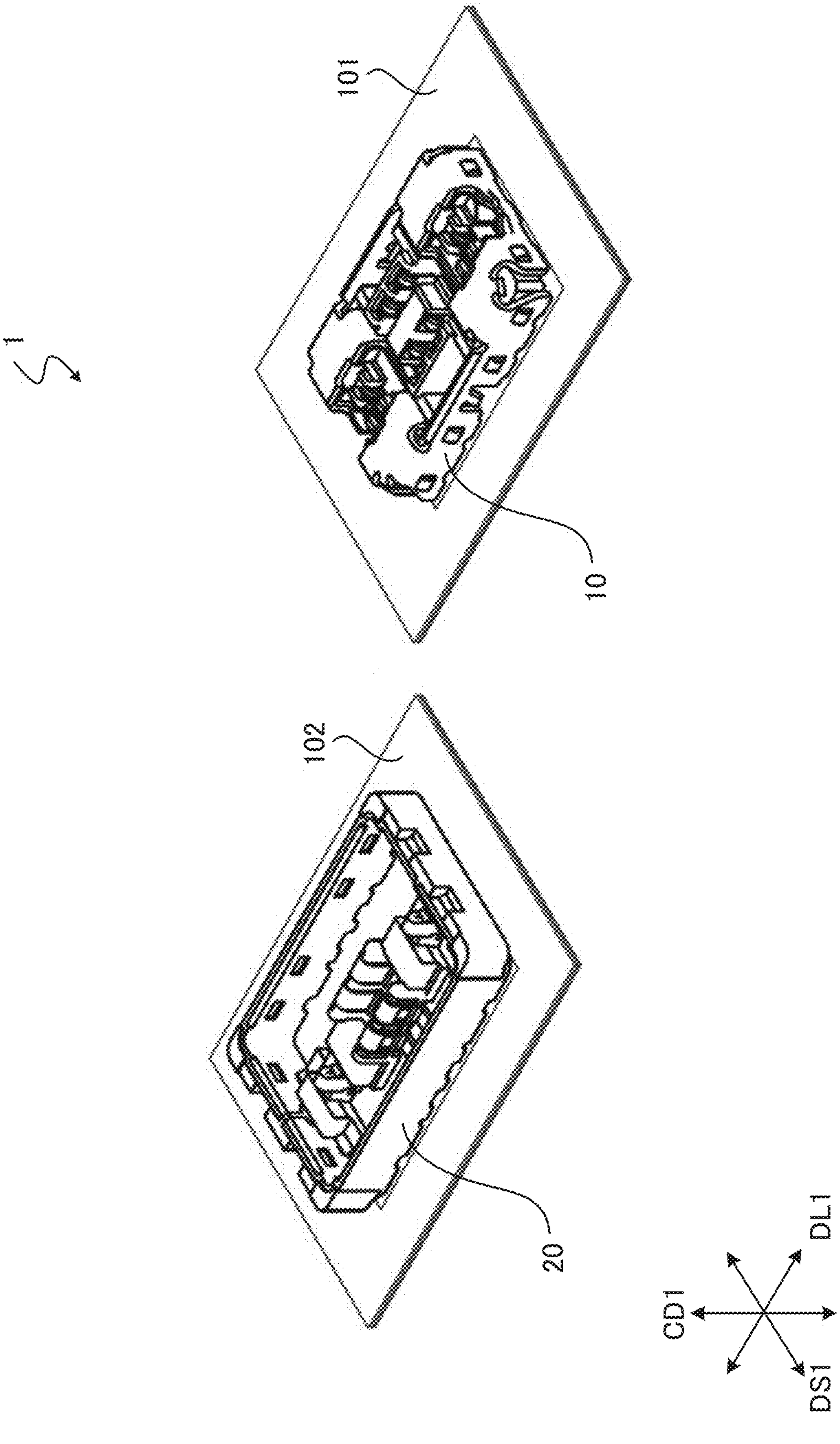
FIG. 1 is a perspective view of a connector unit according to Embodiment 1 of the present disclosure.

Hereinafter, a connector and a connector unit including the connector according to embodiments of the present disclosure are described while referencing the drawings. In the description, identical constituents and elements having identical functions are denoted with the same reference numerals, and redundant descriptions are foregone.

Embodiment 1

A connector unit 1 is a unit that is used to connect circuit boards in an electronic device. Specific examples of the electronic device include portable communication terminals such as mobile phones, smartphones, laptop computers, and tablet computers, but the electronic device is not limited thereto. As illustrated in FIG. 1, the connector unit 1 includes a receptacle connector 10 and a plug connector 20. A circuit board 101 and a circuit board 102 are electrically connected by fitting the receptacle connector 10 and the plug connector 20 together.

In a state in which the receptacle connector 10 and the plug connector 20 are disposed (placed) so as to fit together, the shape of the plug connector 20 when viewed from the receptacle connector 10 and the shape of the receptacle connector 10 when viewed from the plug connector 20 are both similar to rectangles. Additionally, in the state in which the receptacle connector 10 and the plug connector 20 are disposed so as to fit together, a long side direction (longitudinal direction) of the receptacle connector 10 and a long side direction (longitudinal direction) of the plug connector 20 are substantially parallel to each other. A short side direction (lateral direction) of the receptacle connector 10 and a short side direction (lateral direction) of the plug connector 20 are substantially parallel to each other. Moreover, the lateral directions are substantially at right angles to the longitudinal directions. In the following, a direction along the long sides of this rectangle is referred to as a "long side direction DL1", and a direction along the short sides of this rectangle is referred to as a "short side direction DS1." A direction perpendicular to this rectangle (normal direction of the circuit board) is referred to as a "connecting direction CD1" of the receptacle connector 10 and the plug connector 20. In the following, when describing the structure of the plug connector 20 viewed from the receptacle connector 10 in the state in which the receptacle connector 10 and the plug connector 20 are disposed so as to fit together, the phrase "viewed from the receptacle connector 10" is simply used. When describing the structure of the receptacle connector 10 viewed from the plug connector 20, the phrase "viewed from the plug connector 20" is simply used. Additionally, in the various drawings, each member is denoted with a reference numeral and, when a larger constituent that includes the member is denoted with a reference numeral, the reference numeral of the larger constituent is denoted in parentheses.

Receptacle Connector

Figure 2A:
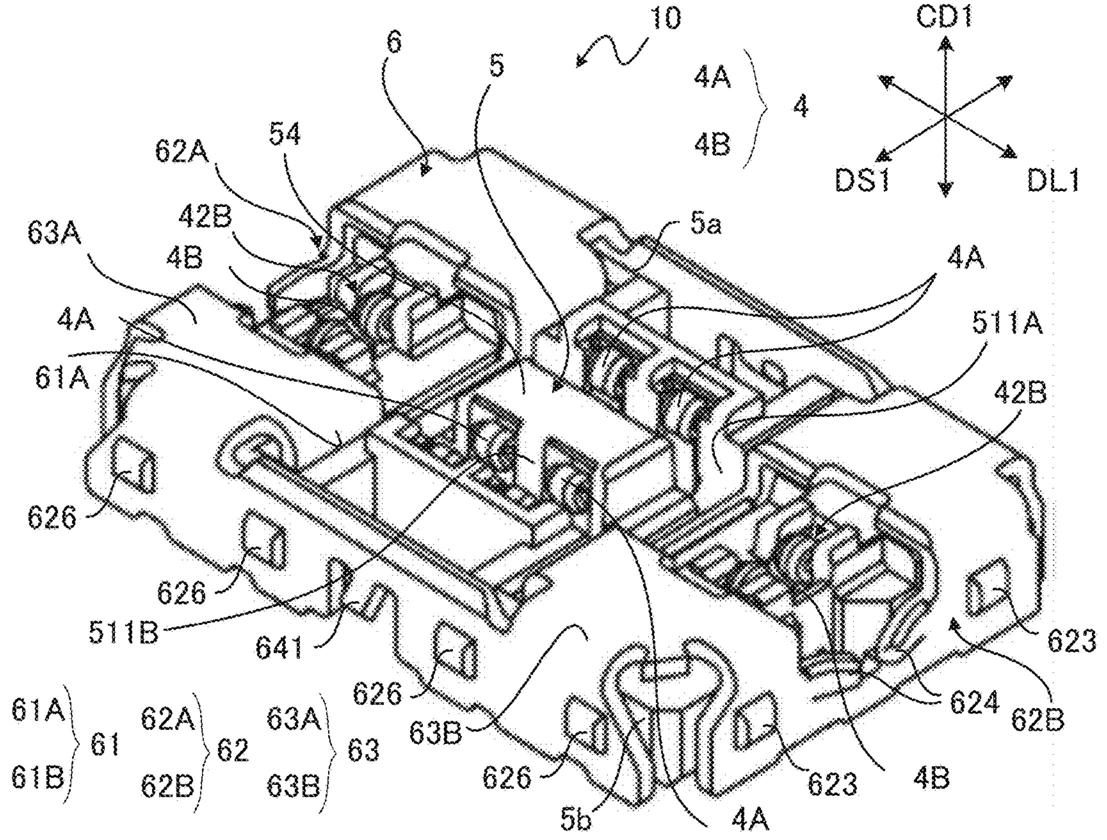
FIG. 2A is a perspective view of a receptacle connector according to Embodiment 1 of the present disclosure.

Firstly, the configuration of the receptacle connector 10 is described. As illustrated in FIG. 1, the receptacle connector 10 is attached to the circuit board 101 and connects to the plug connector 20 that is the mating connector, thereby enabling communication between a circuit on the circuit board 101 and a circuit on the circuit board 102. A surface of the receptacle connector 10 that is attached to the circuit board 101 is referred to as a "bottom surface", and a surface opposite the bottom surface is referred to as a "top surface." As illustrated in FIGS. 2 to 4, the receptacle connector 10 includes a plurality of electrically conductive contacts 4, a contact holder 5 that holds the contacts 4, and a shell 6 that covers the contact holder 5.

Each of the contacts 4 is connected to a conductor (wiring) of the circuit formed on the circuit board 101, and contacts a corresponding contact 7 (described later) of the plug connector 20. The contacts 4 are formed by punching a single layer plate material from a metal thin plate, and subjecting the obtained plate material to bending or the like. The plurality of contacts 4 may include contacts 4 of mutually different types. For example, the plurality of contacts 4 includes a plurality of type 1 contacts 4A, and at least one type 2 contact 4B of a different type than the type 1 contacts 4A. In one example, the receptacle connector 10 includes four of the type 1 contacts 4A and two of the type 2 contacts 4B.

The phrase "of different types" means belonging to mutually different types based on definitions that identify the types. Specific examples of type differences include a difference in the frequency band of the signal to be transmitted, a difference in allowable current, a difference in allowable voltage, a difference in whether for connecting a signal conductor (a conductor forming a portion of a signal circuit) or for connecting a ground connector (a conductor forming a portion of a ground circuit), and the like. In the following description, an example is given in which the type 2 contacts 4B are contacts that transmit signals of a higher frequency than the type 1 contacts 4A.

Figure 2B:
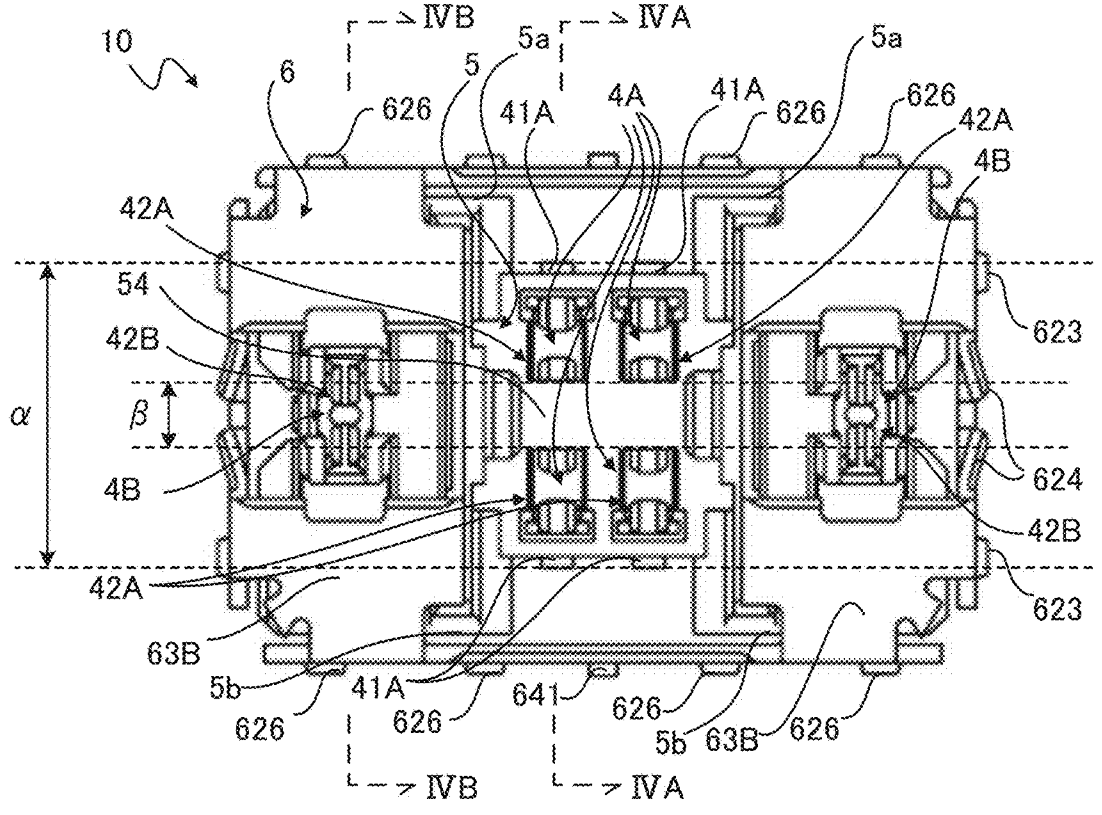
FIG. 2B is a plan view of the receptacle connector of FIG. 2A.
Figure 3:
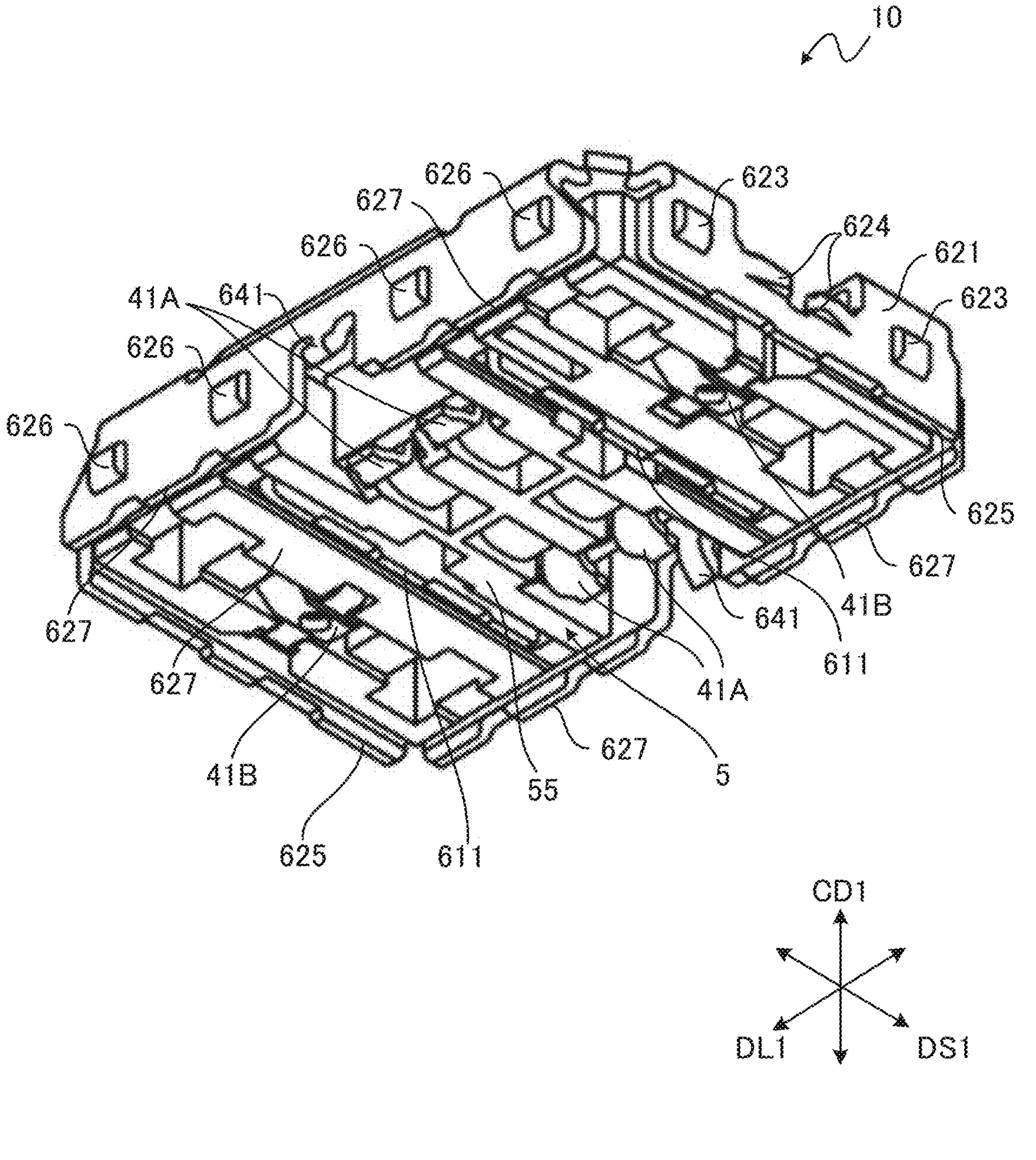
FIG. 3 is a perspective view of the receptacle connector of FIG. 2, from another direction.
Figure 4A:
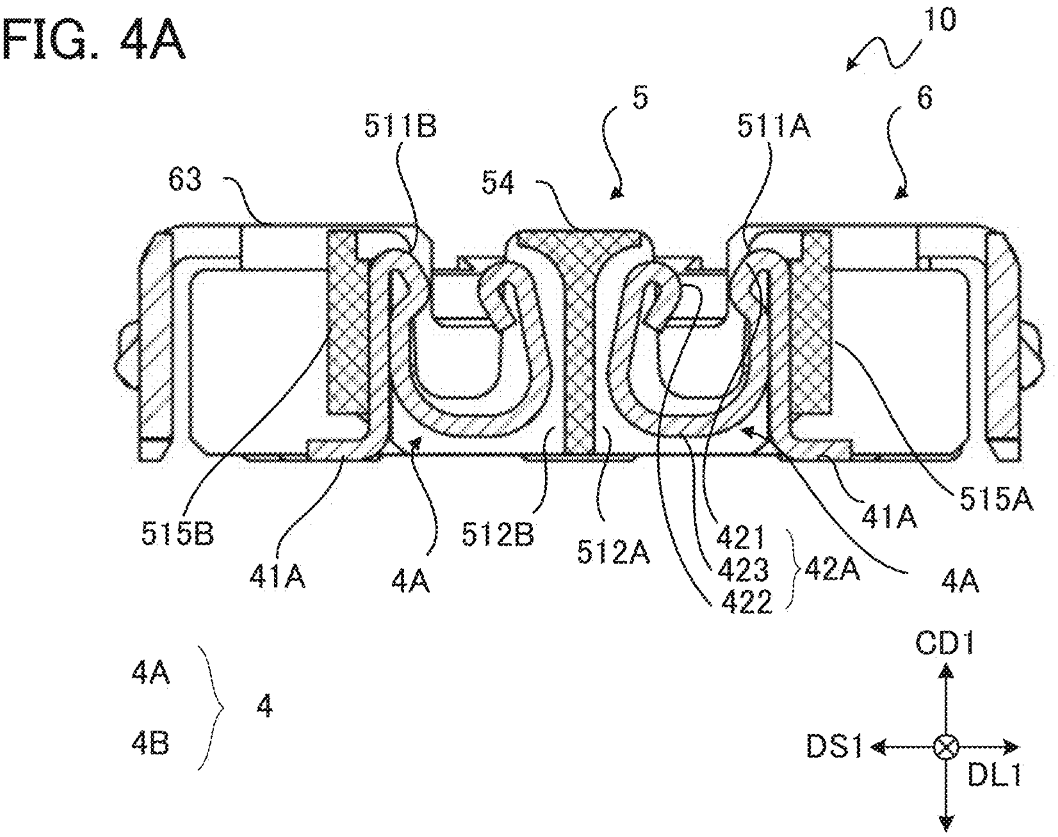
FIG. 4A is a cross-sectional view of a type 1 holding area, taken along line IVA-IVA of FIG. 2B.

As illustrated in FIG. 4A that corresponds to a cross-sectional view taken along line WA of FIG. 2B, each of the type 1 contacts 4A includes a connecting portion 41A and a contacting portion 42A. An end of the connecting portion 41A is connected to a conductor (for example, a signal conductor) of the circuit board 101. The contacting portion 42A contacts a contact 7 (described later) of the plug connector 20. The connecting portion 41A and the contacting portion 42A are coupled to each other.

The contacting portion 42A includes a first portion 421, a second portion 422, and a coupling portion 423. The first portion 421 and the second portion 422 each project (extend) toward the plug connector 20 along the connecting direction CD1 from a base near the bottom surface of the receptacle connector 10, and sandwich the contact 7 of the plug connector 20 when the receptacle connector 10 and the plug connector 20 are fitted together. The coupling portion 423 connects the base of the first portion 421 and the base of the second portion 422. The connecting portion 41A is bent back and extends toward the bottom surface from a tip of the first portion 421. An end of the connecting portion 41A projects outward. Note that the connecting portion 41A may have any shape provided that attachment to the circuit board 101 is possible, and may have a shape that does not project outward.

Figure 4B:
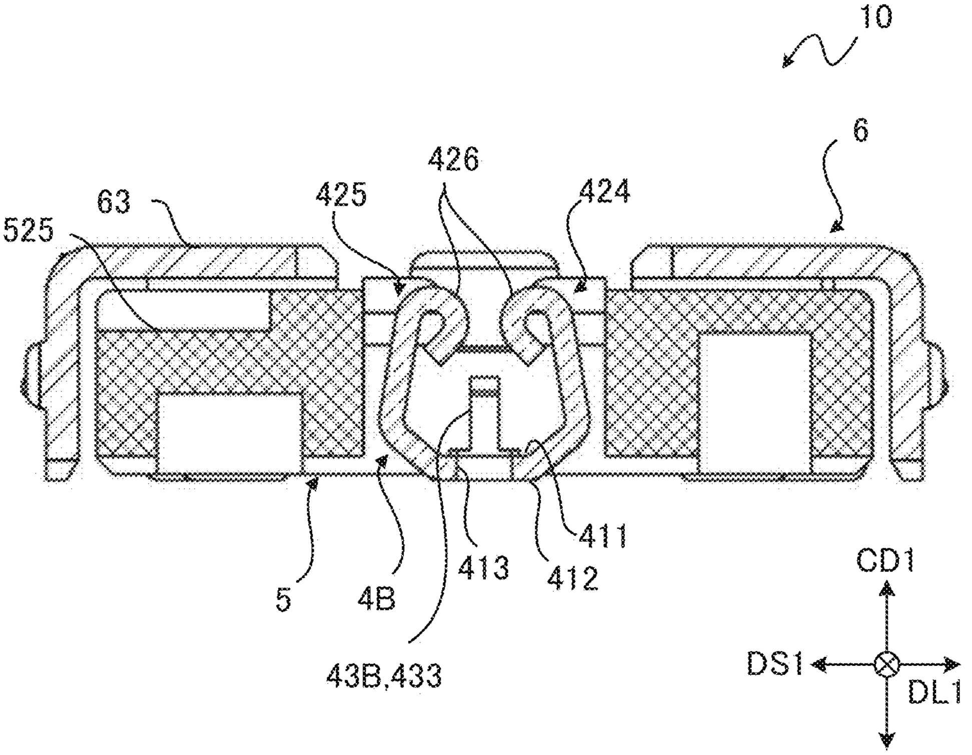
FIG. 4B is a cross-sectional view of a type 2 holding area, taken along line IVB-IVB of FIG. 2B.
Figure 5A:
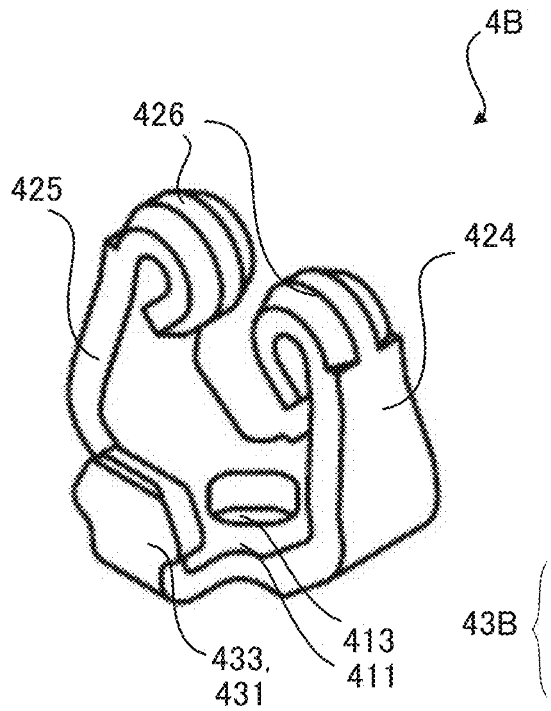
FIG. 5A is a perspective view of a type 2 contact of the receptacle connector according to Embodiment 1 of the present disclosure.
Figure 5B:
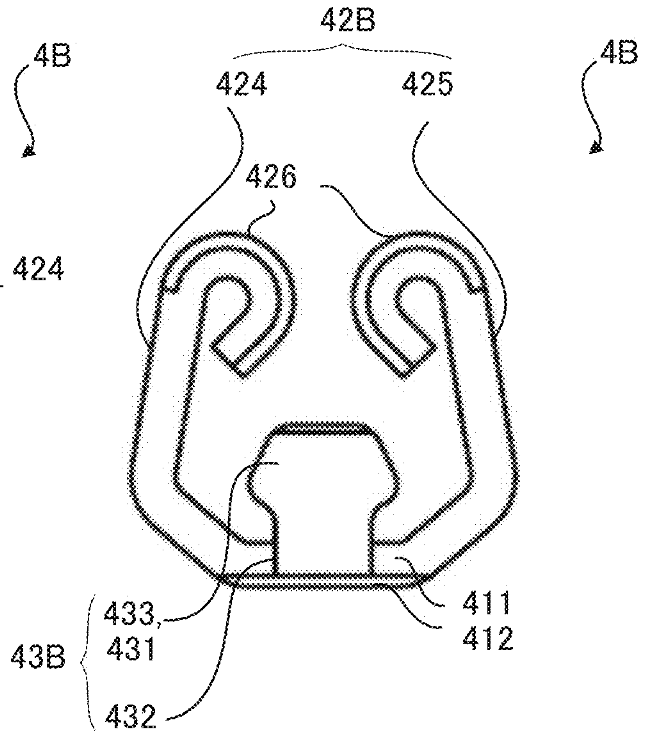
FIG. 5B is front view of the type 2 contact.
Figure 5C:
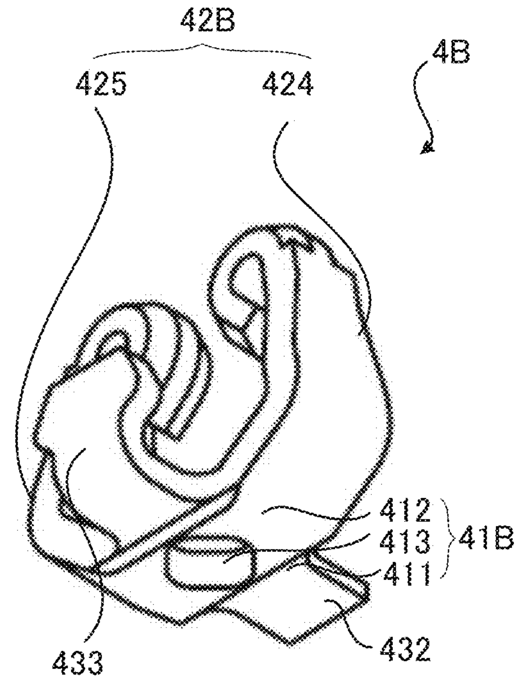
FIG. 5C is a perspective view of FIG. 5A, from another direction.
Figure 5D:
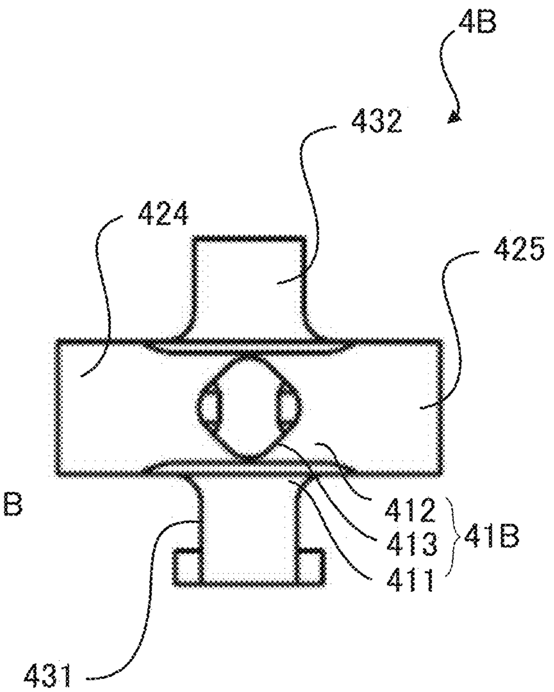
FIG. 5D is a bottom view of the type 2 contact.

As illustrated in FIG. 4B that corresponds to a cross-sectional view taken along line IVB of FIG. 2B, and FIGS. 5A to 5D, the type 2 contacts 4B each include a connecting portion 41B, a contacting portion 42B, and an engaged portion 43B. The connecting portion 41B connects a projection 412 forming the bottom (projecting from the bottom) of the base 411 to a conductor (for example, a signal conductor) of the circuit board 101. The contacting portion 42B contacts the contact 7 (described later) of the plug connector 20. The type 2 contact 4B is fixed to the receptacle connector 10 as a result of the engaged portion 43B engaging with (an engaging portion of) the contact holder 5. The connecting portion 41B, the contacting portion 42B, and the engaged portion 43B are formed as an integrated part.

The connecting portion 41B is a part that contacts the conductor of the circuit board 101, and is positioned directly below the contacting portion 42B (near the bottom surface in the connecting direction CD1). The connecting portion 41B includes a base 411, and the projection 412 that projects slightly from the bottom of the base 411. The projection 412 is connected to a conductor (for example, a signal conductor) of the circuit board 101. A circular hole 413 is provided at the center of the projection 412 and the base 411. Mounting on the circuit board 101 can be confirmed through the hole 413. Note that the connecting portion 41B may have any shape provided that attachment to the circuit board 101 is possible, and may have a structure that does not include the projection 412.

The contacting portion 42B is a part that contacts the contact 7 of the plug connector 20, and includes a first arm 424 and a second arm 425. The first arm 424 and the second arm 425 each project toward the plug connector 20 along the connecting direction CD1 from both sides of the base 411, and sandwich the contact 7 of the plug connector 20 when the receptacle connector 10 and the plug connector 20 are fitted together. Portions near the tips of the first arm 424 and the second arm 425 respectively curve toward the connecting portion 41B, and form pressers 426. The first arm 424 and the second arm 425 are formed in a plane symmetrical shape with respect to a DL1-CD1 plane that passes through the base 411. Note that the directions in which the first arm 424 and the second arm 425 project with respect to the reference plane, namely the DL1-CD1 plane, need not be the same. For example, the first arm 424 may project along a direction inclined toward the connecting direction CD1, and the second arm 425 may project opposite the first arm 424.

The engaged portion 43B is a part for fixing the type 2 contact 4B to the contact holder 5. The engaged portion 43B includes a first portion 431 and a second portion 432 that extend from both sides of the base 411 in a direction that crosses the extending direction of the contacting portion 42B. The first portion 431 is formed in a flat plate shape, and a tip thereof includes a substantially trapezoidal protrusion 433 that rises along the connecting direction CD1. The protrusion 433 is positioned near a type 1 holding area 51 (described later) of the contact holder 5. The second portion 432 is formed in a flat plate shape, and is positioned near a surrounding wall 62 (described later) of the contact holder 5.

Figure 6:
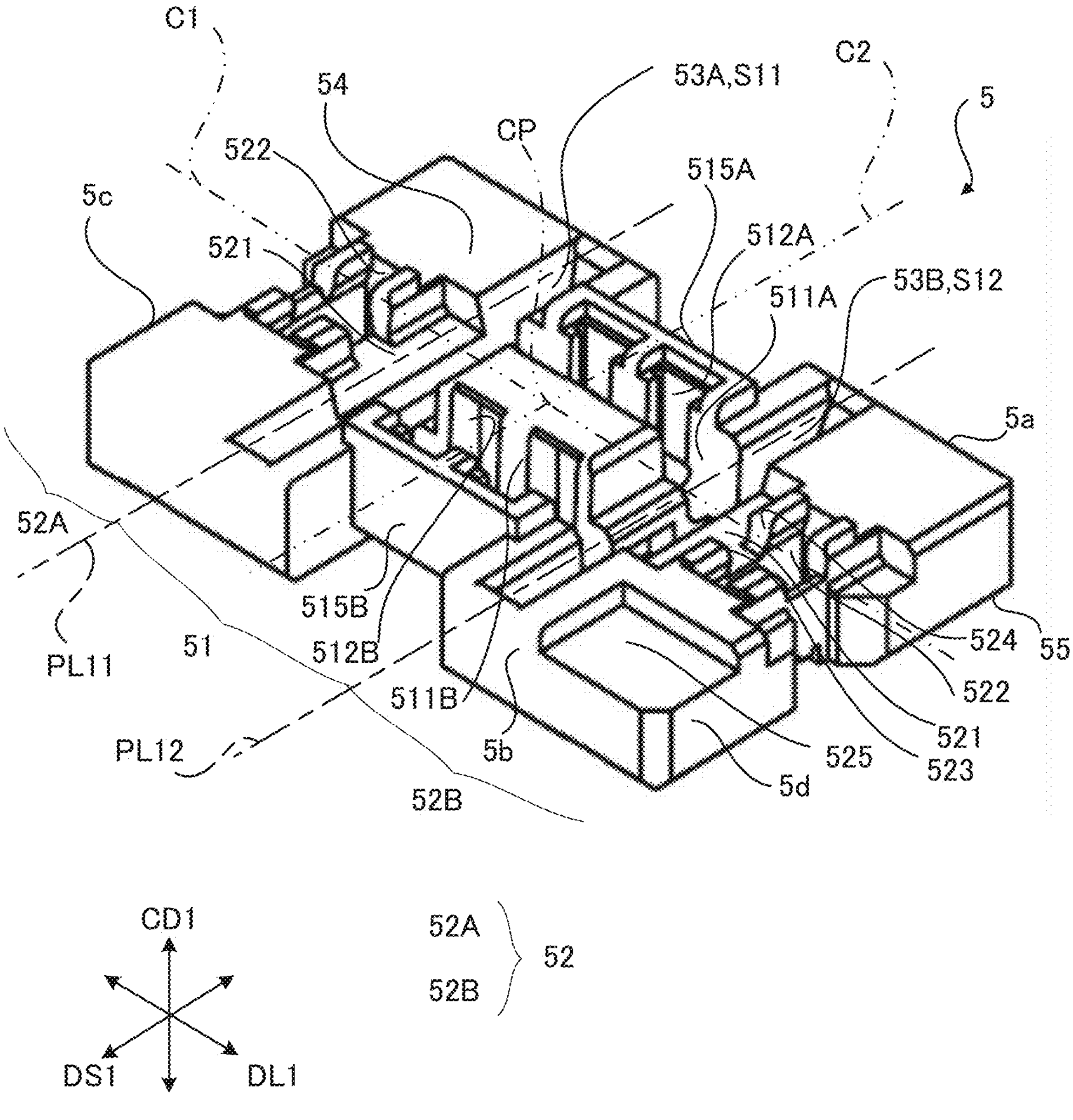
FIG. 6 is a perspective view of a contact holder of the receptacle connector of FIG. 2.

The contact holder 5 is an insulating member that holds the plurality of contacts 4. In one example, the contact holder 5 is formed by injection molding a resin material or the like. As illustrated in FIGS. 3 and 6, the contact holder 5 includes a bottom surface 55 that opposes the circuit board 101, a top surface 54 opposite the bottom surface 55, a type 1 contact holder that holds the type 1 contacts 4A, and a type 2 contact holder that holds the type 2 contacts 4B. Viewed from the plug connector 20, the contact holder 5 has an outer shape similar to a rectangle. This rectangle includes a pair of long sides 5*a* and 5*b* arranged along the long side direction DL1, and a pair of short sides 5*c* and 5*d* arranged along the short side direction DS1.

The contact holder 5 is partitioned, in a direction perpendicular to the connecting direction CD1, into a plurality of holding areas. In the present embodiment, the plurality of holding areas includes a type 1 holding area 51 partitioned as the type 1 contact holder, and a type 2 holding area 52 partitioned as the type 2 contact holder. The type 1 holding area 51 holds a plurality of the contacts 4. In one example, the type 1 holding area 51 holds the four type 1 contacts 4A. The type 2 holding area 52 holds one of the contacts 4 and does not hold the other contacts 4. In one example, the type 2 holding area 52 holds one of the type 2 contacts 4B.

The plurality of holding areas may include two of the type 2 holding areas 52, and at least one type 1 holding area 51 may be interposed among the plurality of type 2 holding areas 52. In one example, the contact holder 5 is partitioned into one type 1 holding area 51, and two type 2 holding areas 52, which sandwich the type 1 holding area 51. The type 1 holding area 51 and the two type 2 holding areas 52 are arranged in the long side direction DL1. In the following, the two type 2 holding areas 52 are distinguished as type 2 holding areas 52A and 52B.

The plurality of holding areas may be partitioned by spaces formed in the contact holder 5. In one example, the type 2 holding area 52A and the type 1 holding area 51 are partitioned by a space S11 formed along a boundary PL11 parallel to the short side direction DS1. In the present embodiment, the type 2 holding area 52A and the type 1 holding area 51 are partitioned by a slit 53A parallel to the short side direction DS1.

The type 1 holding area 51 and the type 2 holding area 52B are partitioned by a space S12 formed along a boundary PL12 parallel to the short side direction DS1. In one example, the type 1 holding area 51 and the type 2 holding area 52B are partitioned by a slit 53B parallel to the short side direction DS1.

Note that, herein, the term "space" does not mean a space in a state in which the receptacle connector 10 is completed, but means a space in a case in which the contact holder 5 exists alone. That is, the term "space" includes portions that are filled in by other members different from the contact holder 5 in the state in which the receptacle connector 10 is completed. For example, at least a portion of the space S11 is filled in by a partition wall 61A, described later, and at least a portion of the space S12 is filled in by a partition wall 61B, described later.

In the contact holder 5, the type 2 contacts 4B disposed in the type 2 holding areas 52A and 52B are disposed such that the connecting portion 41B and the contacting portion 42B appear to overlap when viewed from the connecting direction CD1. In other words, the type 2 contacts 4B are disposed such that the portions contacting the contacts 7 of the plug connector 20 and the contacting portions 42B are arranged in the same direction. For example, the type 2 contacts 4B are disposed such that the positional relationships of the connecting portions 41B and the contacting portions 42B are arranged along the connecting direction CD1. Viewed from the plug connector 20, the contacting portions 42B of the type 2 contacts 4B are disposed inward from the outer edge of the contact holder 5.

Viewed from the connecting direction CD1, the plurality of type 1 contacts 4A are disposed in the type 1 holding area 51 such that a coupling direction (direction in which the coupled connecting portion 41A and contacting portion 42A are arranged) of the connecting portion 41A and the contacting portion 42A of each type 1 contact 4A is arranged in the same direction. In other words, the type 1 contacts 4A are disposed such that the portions contacting the contacts 7 of the plug connector 20 and the contacting portions 42A are arranged in the same direction. For example, the type 1 contacts 4A are disposed such that the coupling direction between the connecting portion 41A and the contacting portion 42A is arranged in the short side direction DS1. Viewed from the plug connector 20, the contacting portions 42A of the type 1 contacts 4A are disposed inward from the outer edge of the contact holder 5.

As illustrated in FIG. 6, each of the type 1 holding area 51 and the type 2 holding areas 52 includes an accommodation groove arranged along the same direction (the long side direction DL1 in the present embodiment). As illustrated in FIG. 2, in each of the type 1 holding area 51 and the type 2 holding areas 52, the contacting portions 42A and 42B of all of the contacts 4A and 4B are disposed so as to be exposed from the accommodation groove. A raised holding portion (described later) of the plug connector 20 is accommodated in the accommodation groove. The contacts 4A and 4B are disposed such that the contacting portions 42A and 42B contact contacting portions 72 (described later) of the contacts 7 disposed on the plug connector 20.

One accommodation groove is positioned nearer to the long side 5*a* than a center axis C1 that is arranged along the long side direction DL1, and another accommodation groove is positioned nearer to the long side 5*b* than the center axis C1. The two accommodation grooves are located at line symmetrical positions with respect to the center axis C1.

In the present embodiment, as illustrated in FIG. 6, the type 1 holding area 51 includes two accommodation grooves 511A and 511B that are parallel to each other. The accommodation grooves 511A and 511B are formed on the top surface 54 of the contact holder 5 along the long side direction DL1. On the top surface 54, the accommodation groove 511A is positioned nearer to the long side 5*a* than the center axis C1, and the accommodation groove 511B is positioned nearer to the long side 5*b* than the center axis C1. The accommodation groove 511A is located at a position that has line symmetry with the accommodation groove 511B, with respect to the center axis C1 that is arranged along the long side direction DL1.

As illustrated in FIG. 2, the type 1 contacts 4A held by the type 1 holding area 51 include two contacts disposed arranged along the accommodation groove 511A, and two contacts disposed arranged along the accommodation groove 511B. That is, the type 1 holding area 51 includes a plurality of the type 1 contacts 4A arranged along the long side direction DL1. Here, "a region α sandwiched by the type 1 contacts 4A that face each other in the short side direction DS1" refers to a region sandwiched by the type 1 contacts 4A disposed in the accommodation groove 511A and the type 1 contacts 4A disposed in the accommodation groove 511B. Note that "the region α sandwiched by the set of type 1 contacts 4A" may include from a portion where the type 1 contacts 4A disposed in the accommodation groove 511A contact a recess 515A, described later, to a portion where the type 1 contacts 4A disposed in the accommodation groove 511B contact a recess 515B, described later. Specifically, "the region α sandwiched by the set of type 1 contacts 4A" may include the region in which the type 1 contacts 4A accommodated in the accommodation groove 511A are disposed, and the region in which the type 1 contacts 4A accommodated in the accommodation groove 511B are disposed.

In the present embodiment, as illustrated in FIG. 6, the type 1 holding area 51 includes two contact accommodators 512A arranged along the accommodation groove 511A. Each of the contact accommodators 512A includes a hole that penetrates from the bottom surface 55 of the contact holder 5 to the accommodation groove 511A. The contact accommodators 512A are located at positions that have line symmetry with a contact accommodator 512B, described later, with respect to the center axis C1. Furthermore, the two contact accommodators 512A are located at line symmetrical positions with respect to a center axis C2 therebetween, the center axis C2 being arranged along the short side direction DS1. As illustrated in FIG. 4A, the contacting portion 42A of each of the type 1 contacts 4A is fixed in each of the contact accommodators 512A by press fitting or the like, such that the first portion 421 and the second portion 422 are exposed to the outside from the accommodation groove 511A. As a result of this configuration, the type 1 contacts 4A disposed in the accommodation groove 511A are disposed such that a direction in which a line, that connects the connecting portion 41A and the contacting portion 42A, extends when viewed from the connecting direction CD1 is parallel to the short side direction DS1. As illustrated in FIG. 2B, the connecting portion 41A of each type 1 contact 4A disposed in the accommodation groove 511A projects toward the long side 5*a* (5*b*) from the contacting portion 42A.

As illustrated in FIG. 6, the type 1 holding area 51 further includes a recess 515A in a center section (center section in the long side direction DL1) of a side surface arranged along the long side 5*a*. The recess 515A is formed throughout, from the top surface 54 to the bottom surface 55. As illustrated in FIG. 4A, the connecting portions 41A of the type 1 contacts 4A disposed in the accommodation groove 511A are exposed to the inside of the recess 515A when viewed from the plug connector 20. Due to this configuration, connection states of the connecting portions 41A to the circuit board 101 can be visually confirmed.

Additionally, as illustrated in FIG. 6, the type 1 holding area 51 includes two contact accommodators 512B arranged along the accommodation groove 511B. Each of the contact accommodators 512B includes a hole that penetrates from the bottom surface 55 of the contact holder 5 to the accommodation groove 511B. The two contact accommodators 512B are located at line symmetrical positions with respect to the center axis C2 therebetween, the center axis C2 being arranged along the short side direction DS1. Accordingly, the two contact accommodators 512A and the two contact accommodators 512B are disposed having point symmetry with respect to an intersection CP of the center axes C1 and C2. That is, when the contact holder 5 rotates 180° around the intersection CP on the DL1-DS1 plane, the contact accommodators 512A move to the positions where the contact accommodators 512B existed, and the contact accommodators 512B move to the positions where the contact accommodators 512A existed. As illustrated in FIG. 4A, the contacting portions 42 are fixed in each of the contact accommodators 512B by press fitting or the like, such that the first portion 421 and the second portion 422 are exposed. As a result of this configuration, each of the type 1 contacts 4A arranged along the accommodation groove 511B is disposed such that a direction in which a line, that connects the connecting portion 41A and the contacting portion 42A, extends when viewed from the connecting direction CD1 is parallel to the short side direction DS1. As illustrated in FIG. 2B, the connecting portion 41A of each type 1 contact 4A disposed in the accommodation groove

511B projects toward the long side 5*b* from the contacting portion 42A. That is, the connecting portions 41A of the type 1 contacts 4A of the accommodation groove 511A and the connecting portions 41A of the type 1 contacts 4A of the accommodation groove 511B project in mutually opposite directions.

As illustrated in FIG. 6, the type 1 holding area 51 further includes a recess 515B in a center section (center section in the long side direction DL1) of a side surface arranged along the long side 5*b*. As illustrated in FIG. 4A, the connecting portions 41A of the type 1 contacts 4A disposed in the accommodation groove 511B are exposed to the inside of the recess 515B when viewed from the plug connector 20.

As illustrated in FIG. 6, each of the type 2 holding areas 52A and 52B includes one accommodation groove 521. The accommodation groove 521 extends parallel to the long side direction DL1 and is formed on the top surface 54 of the contact holder 5. On the top surface 54, the accommodation groove 521 is positioned in the middle between the long side 5*a* and the long side 5*b* (the middle in the short side direction DS1).

The type 2 contacts 4B are disposed in each of the accommodation grooves 521. Additionally, each of the type 2 holding areas 52A and 52B includes one contact accommodator 522. The contact accommodator 522 includes a hole that is provided on the bottom surface 55 of the contact holder 5 and that is open to the accommodation groove 521. The contacting portions 42B of the type 2 contacts 4B are fixed in the accommodation groove 521 by press fitting or the like, such that the first arm 424 and the second arm 425 are exposed. The type 2 contacts 4B are disposed in the accommodation groove 521 such that a line, that connects the connecting portion 41B and the contacting portion 42B, is parallel to the connecting direction CD1. The accommodation groove 521 is provided in the region α that is sandwiched between the set of type 1 contacts 4A in the short side direction DS1. Specifically, the accommodation groove 521 is provided on the center axis C1. Distances from the two contact accommodators 522 to the center axis C2 are equivalent. Accordingly, when the contact holder 5 rotates 180° around the intersection CP on a plane parallel to DL1 and DS1, the positions of the two contact accommodators 522 (and the type 2 contacts 4B) are interchanged.

As illustrated in FIG. 6, the type 2 holding area 52B further includes a recess 525 on one outer corner portion. The recess 525 is a portion sunken from the top surface 54 toward the bottom surface 55.

The type 2 contact 4B held by the type 2 holding area 52A is adjacent to the type 1 contacts 4A of the type 1 holding area 51 across a boundary PL11. The type 2 contact 4B held by the type 2 holding area 52B is adjacent to the type 1 contacts 4A of the type 1 holding area 51 across a boundary PL12. Thus, a gap G11 in the long side direction DL1 (the arrangement direction) of the contacts 4 adjacent across the boundaries PL11 and PL12 is larger than a gap G12 of the contacts 4 adjacent along the long side direction DL1 in the type 1 holding area 51 (see FIG. 7).

Figure 7:
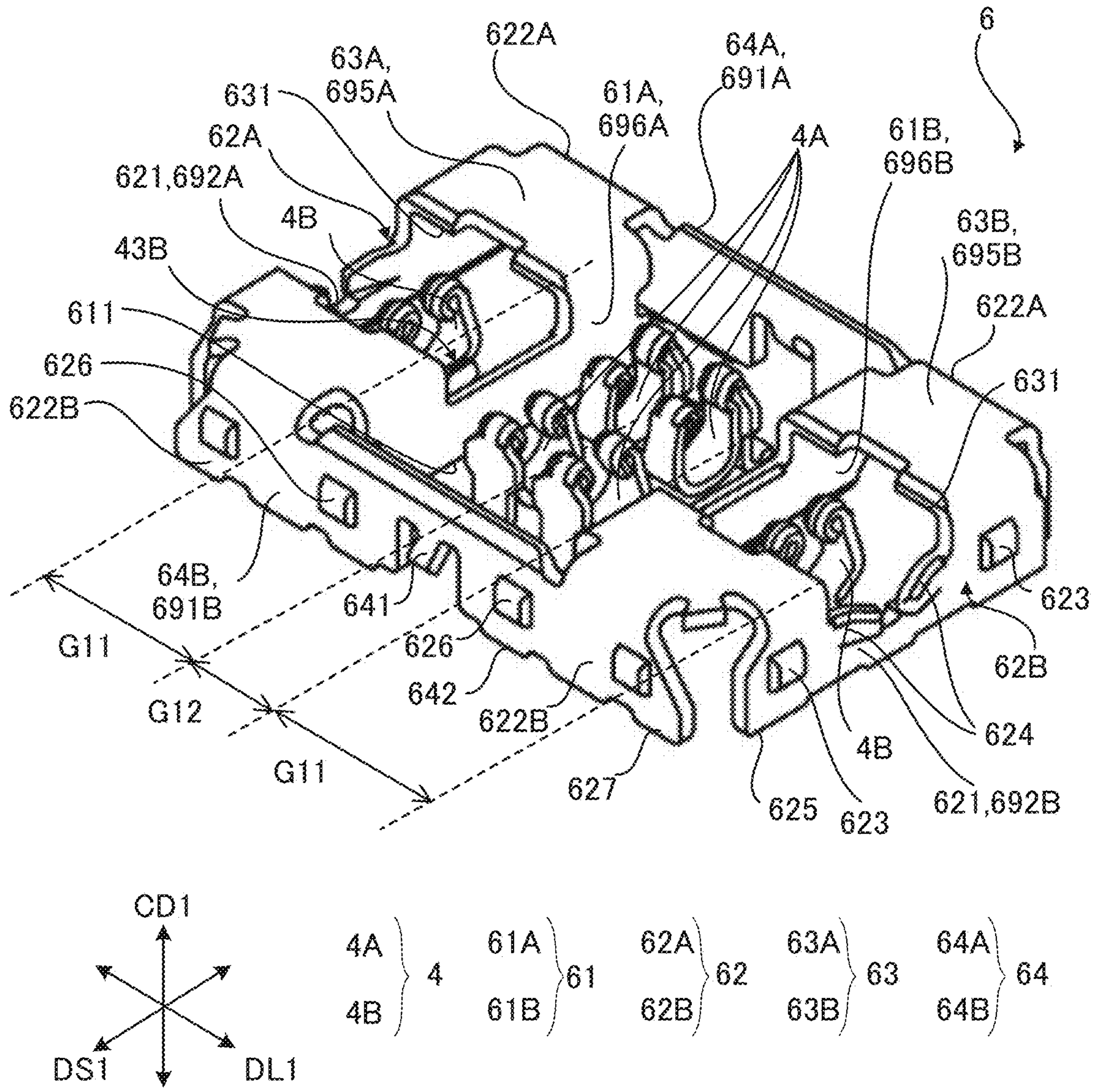
FIG. 7 is a perspective view illustrating an arrangement relationship of the contacts and a shell of the receptacle connector of FIG. 2.

The shell 6 illustrated in FIG. 2 is an electrically conductive member that is mounted on the contact holder 5. As illustrated in FIG. 7, the shell 6 includes at least one partition wall 61 that partitions the contact holder 5 into a plurality of holding areas. The partition wall 61 is electrically connected to a ground conductor (not illustrated in the drawings) of the circuit board 101. The partition wall 61 may be directly connected to the ground conductor of the circuit board 101, or may be connected to the ground conductor of the circuit board 101 via another portion of the shell 6. The shell 6 may include two partition walls 61 that are interposed between the type 2 holding area 52A and the type 2 holding area 52B. The at least one type 1 holding area 51 may be interposed between these two partition walls 61.

In one example, the shell 6 includes partition walls 61A and 61B as the two partition walls 61. The partition wall 61A is positioned in the space S11, and partitions the type 2 holding area 52A and the type 1 holding area 51. The partition wall 61B is positioned in the space S12, and partitions the type 1 holding area 51 and the type 2 holding area 52B. As illustrated in FIG. 3, each of the partition walls 61A and 61B includes an end edge 611 (an end) that contacts the circuit board 101, and is electrically connected to the ground conductor of the circuit board 101 at that end edge 611.

As illustrated in FIGS. 2 and 7, the shell 6 may further include an electrically conductive surrounding wall 62 aligned with the partition wall 61 along the outer periphery of the type 2 holding areas 52. The shell 6 may include a surrounding wall 62 for each of the type 2 holding areas 52A and 52B. In one example, the shell 6 includes an electrically conductive surrounding wall 62A aligned with the partition wall 61A along the outer periphery of the type 2 holding area 52A, and an electrically conductive surrounding wall 62B aligned with the partition wall 61B along the outer periphery of the type 2 holding area 52B. Each of the surrounding walls 62A and 62B includes an opposing portion 621 and side portions 622A and 622B.

The opposing portions 621 oppose the partition walls 61 across the type 2 holding areas 52. For example, the opposing portion 621 of the surrounding wall 62A covers at least a portion of the side surface arranged along the short side 5*c* of the contact holder 5, and opposes the partition wall 61A across the type 2 holding area 52A. The opposing portion 621 of the surrounding wall 62B covers at least a portion of the side surface arranged along the short side 5*d* of the contact holder 5, and opposes the partition wall 61B across the type 2 holding area 52B. As illustrated in FIG. 3, the opposing portion 621 includes an end edge 625 (an end) that contacts the circuit board 101, and is electrically connected to the ground conductor of the circuit board 101 at that end edge 625. The opposing portion 621 includes a protrusion that protrudes outward (direction opposite the direction toward the type 2 holding areas 52). For example, as illustrated in FIG. 7, the opposing portion 621 includes two protrusions 623 arranged along the short side direction DS1, and press fitters 624 at the middle between the two protrusions 623. The press fitters 624 are formed by cutting and bending such that the center projects outward.

The side portion 622A covers at least a portion of the side surface arranged along the long side 5*a* of the type 2 holding areas 52. The side portion 622B covers at least a portion of the side surface arranged along the long side 5*b* of the type 2 holding areas 52. As illustrated in FIG. 3, each of the side portions 622A and 622B includes an end edge (an end) 627 that contacts the circuit board 101, and is electrically connected to the ground conductor of the circuit board 101 at that end edge 627. Each of the side portions 622A and 622B includes a plurality of protrusions 626 that protrudes outward (direction opposite the direction toward the type 2 holding areas 52).

As illustrated in FIGS. 2 and 7, the shell 6 may further include an electrically conductive in-area connection plate 63 (in-area connecting portion) that electrically connects the partition walls 61 and the surrounding walls 62 that are arranged along the outer peripheries of the type 2 holding areas 52 to each other. The in-area connection plate 63 may expand so as to cross the connecting direction CD1. The in-area connection plate 63 may be disposed so as to face the plug connector 20.

The shell 6 may include an in-area connection plate 63 for each of the type 2 holding areas 52A and 52B. In one example, the shell 6 includes in-area connection plates 63A and 63B at two locations. The in-area connection plate 63A electrically connects the partition wall 61A and the surrounding wall 62A arranged along the outer periphery of the type 2 holding area 52A to each other. More specifically, the in-area connection plate 63A covers at least a portion of the top surface 54, and is connected to the end edge of the partition wall 61A, the end edge of the opposing portion 621 of the surrounding wall 62A, and the end edges of the side portions 622A and 622B of the surrounding wall 62A.

The in-area connection plate 63B electrically connects the partition wall 61B and the surrounding wall 62B arranged along the outer periphery of the type 2 holding area 52B to each other. More specifically, the in-area connection plate 63B covers at least a portion of the top surface 54, and is connected to the end edge of the partition wall 61B, the end edge of the opposing portion 621 of the surrounding wall 62B, and the end edges of the side portions 622A and 622B of the surrounding wall 62B. Each of the in-area connection plates 63A and 63B includes an opening 631 for exposing the type 2 contacts 4B disposed in the type 2 holding areas 52.

As illustrated in FIG. 7, the shell 6 may further include an intra-area connection plate (intra-area connecting portion) 64 that electrically connects the partition wall 61A of the outer periphery of the type 2 holding area 52A and the partition wall 61B of the outer periphery of the type 2 holding area 52B. The intra-area connection plate 64 may be arranged along the outer periphery of the type 1 holding area 51. In one example, the shell 6 includes intra-area connection plates 64A and 64B.

The intra-area connection plate 64A covers at least a portion of the side surface arranged along the long side 5*a* of the type 1 holding area 51, and electrically connects the partition wall 61A and the partition wall 61B. Due to this configuration, the two type 1 contacts 4A in the accommodation groove 511A are arranged along the intra-area connection plate 64A and are disposed such that each of the connecting portions 41A projects toward the intra-area connection plate 64A. The intra-area connection plate 64A opposes the connecting portions 41A of the two type 1 contacts 4A.

The intra-area connection plate 64B covers at least a portion of the side surface arranged along the long side 5*b* of the type 1 holding area 51, and electrically connects the partition wall 61A and the partition wall 61B. Due to this configuration, the two type 1 contacts 4A in the accommodation groove 511B are arranged along the intra-area connection plate 64B and are disposed such that each of the connecting portions 41A projects toward the intra-area connection plate 64B. The intra-area connection plate 64B opposes the connecting portions 41A of the two type 1 contacts 4A.

In the connecting direction CD1, as illustrated in FIG. 7, the intra-area connection plates 64A and 64B each include an end edge 642 that opposes the circuit board 101, and a projection 641 that projects downward from the end edge 642 and that contacts a shell 8, described later, of the plug connector 20. The projection 641 is positioned in the middle between the partition walls 61A and 61B (middle of the long side direction DL1). The projection 641 projects outward (direction opposite the direction toward the type 1 holding area 51) in order to avoid contact with the connecting portions 41A of the type 1 contacts 4A.

Due to the shell 6 including the intra-area connection plates 64A and 64B, the type 1 holding area 51 is surrounded by the partition walls 61A and 61B and the intra-area connection plates 64A and 64B. Additionally, the entire contact holder 5 is surrounded by the surrounding walls 62A and 62B and the intra-area connection plates 64A and 64B.

In one example, the shell 6 is formed by punching a single layer plate material from a metal thin plate material, and subjecting the obtained plate material to bending or the like. This plate material includes outer walls 691A, 691B, 692A, and 692B, top plates 695A and 695B, and inner walls 696A and 696B (see FIG. 7).

The outer wall 691A is a plate-like member that forms the side portion 622A of the surrounding wall 62A, the side portion 622A of the surrounding wall 62B, and the intra-area connection plate 64A. The outer wall 691B is a plate-like member that forms the side portion 622B of the surrounding wall 62A, the side portion 622B of the surrounding wall 62B, and the intra-area connection plate 64B. The outer wall 692A is a plate-like member that forms the opposing portion 621 of the surrounding wall 62A. The outer wall 692B is a plate-like member that forms the opposing portion 621 of the surrounding wall 62B. The top plate 695A is a plate-like member that forms the in-area connection plate 63A. The top plate 695B is a plate-like member that forms the in-area connection plate 63B. The inner wall 696A is a plate-like member that forms the partition wall 61A. The inner wall 696B is a plate-like member that forms the partition wall 61B.

The shell 6 is formed by bending the outer walls 691A, 691B, 692A, and 692B and the inner walls 696A and 696B in the same direction at about 90 degrees with respect to the top plates 695A and 695B. The obtained shell 6 is mounted on the contact holder 5 by press-fitting, for example.

Figure 8:
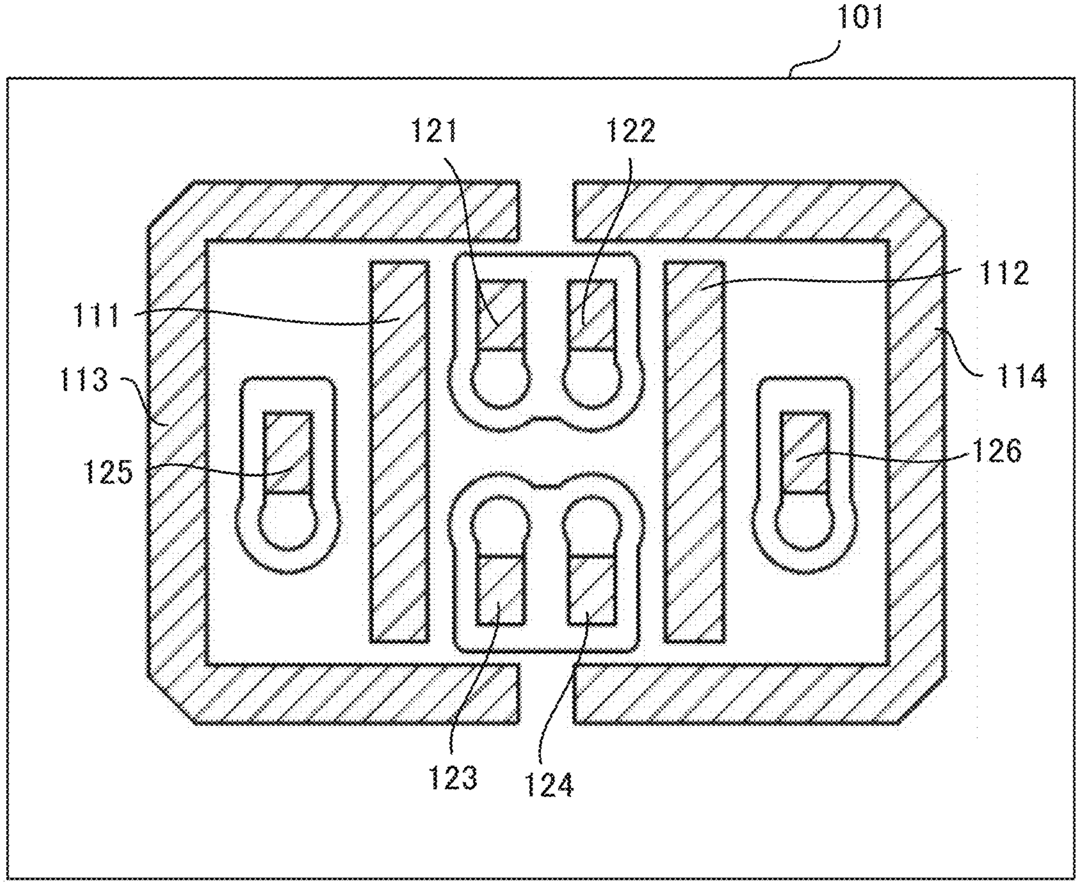
FIG. 8 is a plan view illustrating an arrangement of exposed conductor portions of a circuit board to which the receptacle connector of FIG. 2 is attached.

The receptacle connector 10 configured as described above is attached to the circuit board 101 with the bottom surface 55 facing the circuit board 101. As illustrated in FIG. 8, the circuit board 101 includes ground conductor exposers 111, 112, 113, and 114, and signal conductor exposers 121, 122, 123, 124, 125, and 126. The ground conductor exposers 111, 112, 113, and 114 are portions where the ground conductor of the circuit board 101 is exposed. The end edge 611 of the partition wall 61A, the end edge 611 of the partition wall 61B, the end edges 625 and 627 of the surrounding wall 62A, and the end edges 625 and 627 of the surrounding wall 62B are respectively connected to the ground conductor exposers 111, 112, 113, and 114 by solder or the like.

The signal conductor exposers 121, 122, 123, 124, 125, and 126 are portions where the six signal conductors of the circuit board 101 are respectively exposed. The connecting portions 41A of the four type 1 contacts 4A and the connecting portions 41B of the two type 2 contacts 4B are respectively connected to the signal conductor exposers 121, 122, 123, 124, 125, and 126 by solder or the like. The signal conductor exposers 125 and 126 are disposed directly below the connecting portions 41A and 41B. Note that sizes of the signal conductor exposers 121, 122, 123, and 124 need not necessarily be the same as the sizes of the connecting portions 41A of the type 1 contacts 4A. Likewise, sizes of the signal conductor exposers 125 and 126 need not be the same as the sizes of the connecting portions 41B of the type 2 contacts 4B. For example, the signal conductor exposers may be larger than the connecting portions. In other words, it is sufficient that the signal conductor exposers are large enough to allow soldering to the connecting portions to be performed (the connecting portions overlap the signal conductor exposers) when attaching the receptacle connector 10 to the circuit board 101.

Note that the configurations described above are merely examples and may be modified, as appropriate. For example, configurations are possible in which the contact holder 5 is partitioned into four or more holding areas.

Plug Connector

Figure 9:
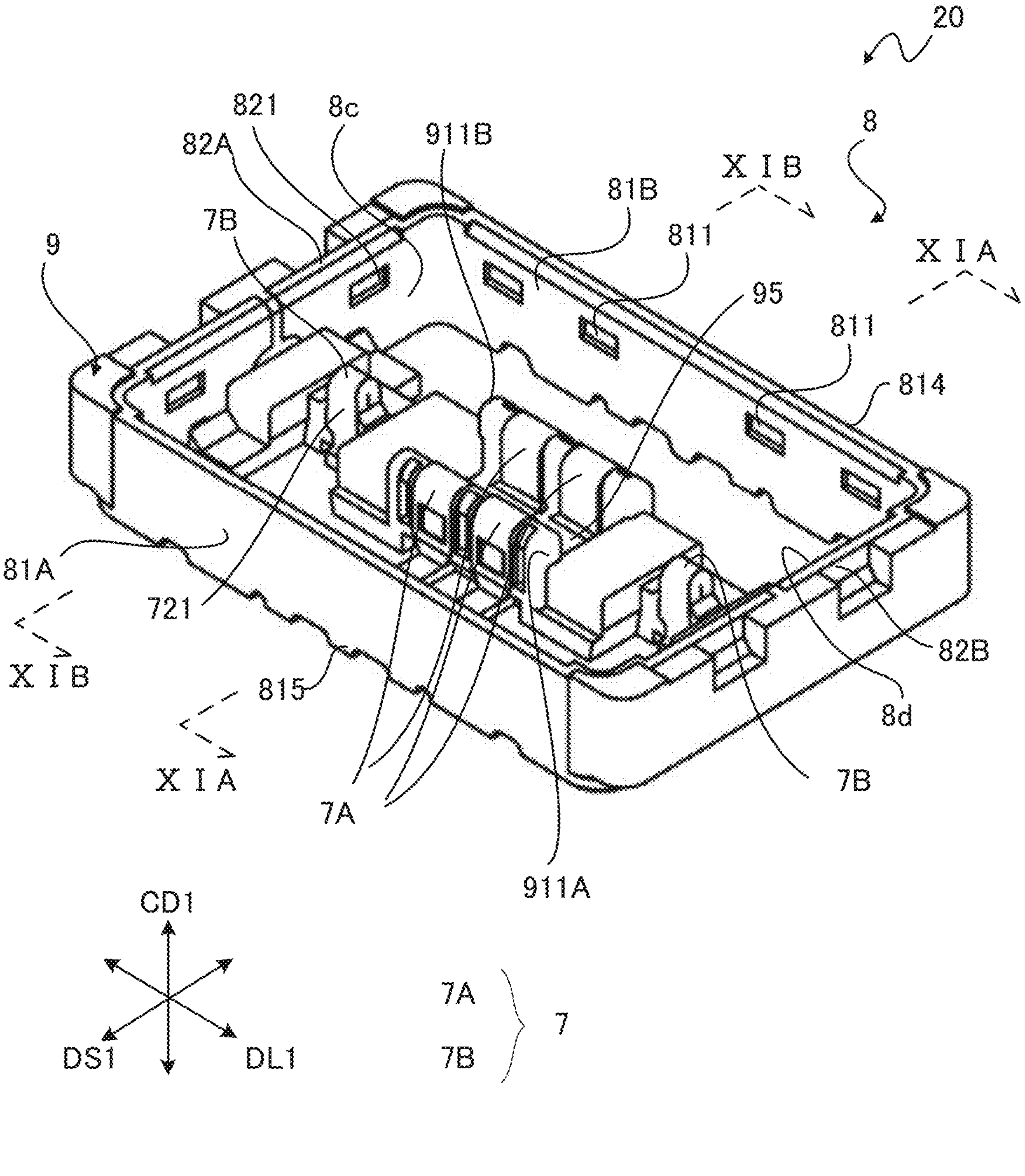
FIG. 9 is a perspective view of a plug connector according to Embodiment 1 of the present disclosure.
Figure 10:
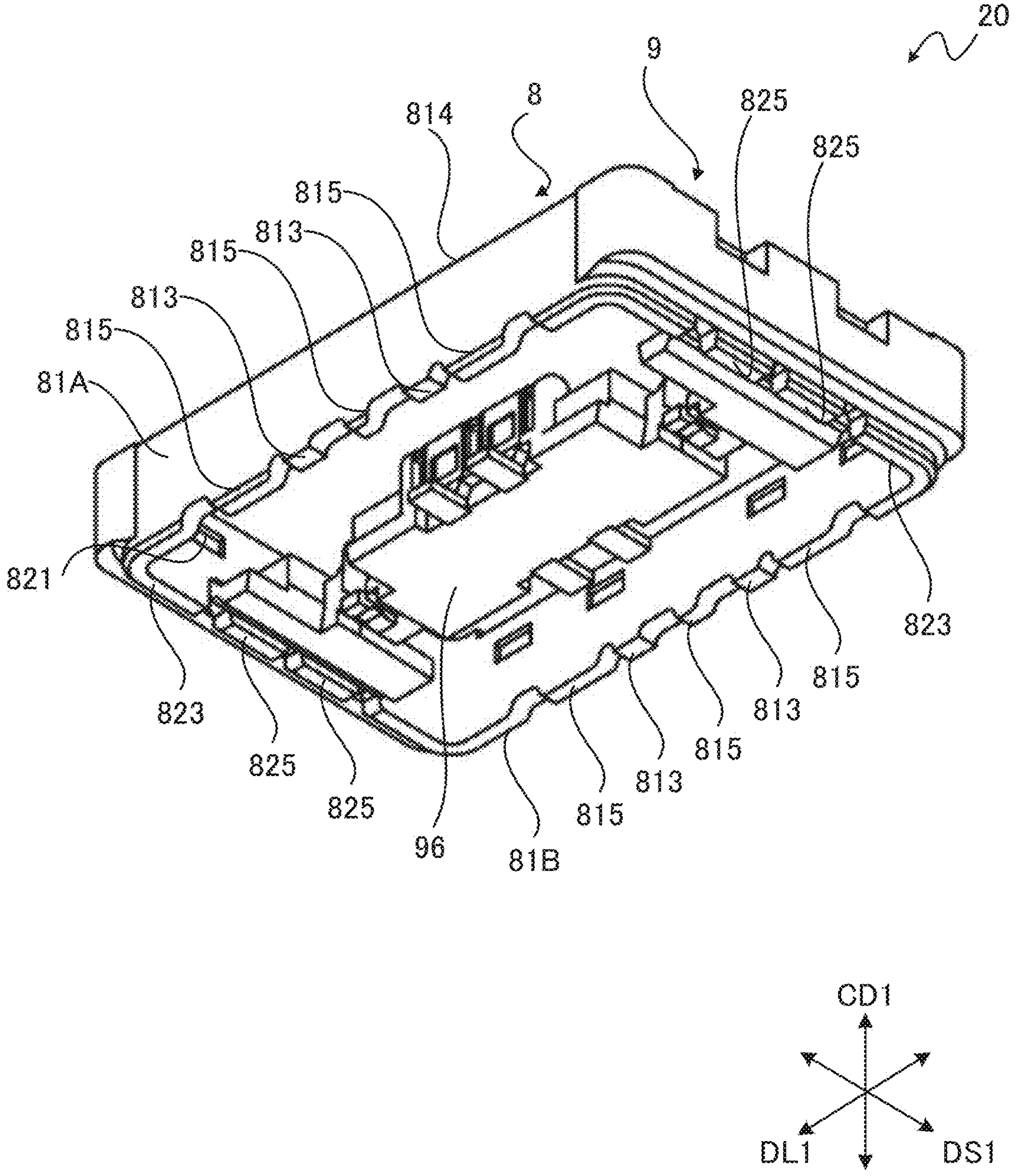
FIG. 10 is a perspective view of the plug connector of FIG. 9, from a different direction.

Next, the configuration of the plug connector 20 is described in detail. As described above, the plug connector 20 is attached to a circuit board 102, and connects to the receptacle connector 10 that is the mating connector. As illustrated in FIGS. 9 to 11, the plug connector 20 includes a plurality of contacts 7, a shell 8, and a contact holder 9.

The plurality of contacts 7 are respectively electrically connected to a plurality of conductors of the circuit board 102, and respectively contact the plurality of contacts 4 of the receptacle connector 10. The contacts 7 are formed by punching a single layer plate material from a metal thin plate, and subjecting the obtained plate material to bending or the like. The plurality of contacts 7 may include contacts 7 of mutually different types. For example, the plurality of contacts 7 includes a plurality of type 1 contacts 7A, and at least one type 2 contact 7B of a different type than the type 1 contacts 7A. In one example, in FIG. 9, the plug connector 20 includes six of the contacts 7, and the six contacts 7 include four of the type 1 contacts 7A and two of the type 2 contacts 7B. In one example, the type 2 contacts 7B are contacts that transmit signals of a higher frequency than the type 1 contacts 7A. The four type 1 contacts 7A and the two type 2 contacts 7B are disposed at positions corresponding to the four type 1 contacts 4A and the two type 2 contacts 4B that the four type 1 contacts 7A and the two type 2 contacts 7B respectively contact.

Figure 11A:
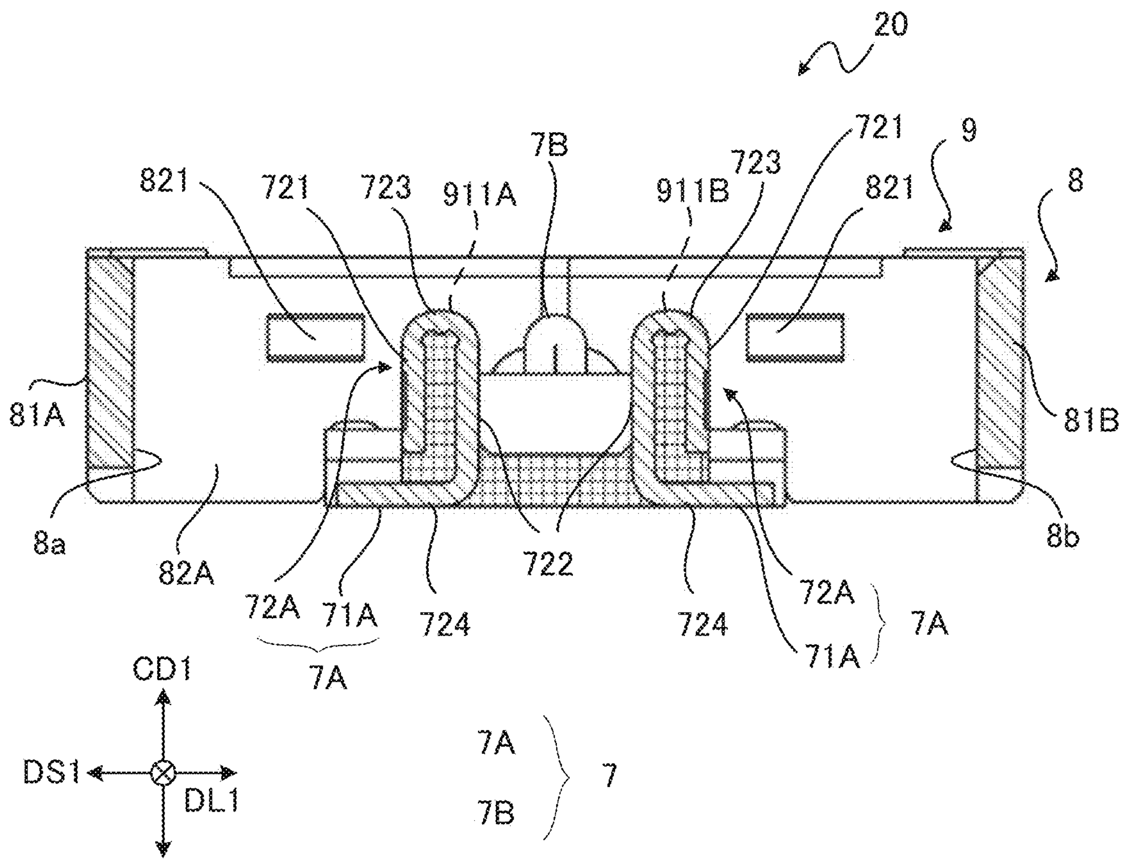
FIG. 11A is a cross-sectional view of a type 1 holding area, taken along line XIA-XIA of FIG. 9.

As illustrated in FIG. 11A that corresponds to a cross-sectional view taken along line XIA of FIG. 9, the type 1 contacts 7A each include a connecting portion 71A and a contacting portion 72A. A conductor (for example a signal conductor) of the circuit board 102 is connected to the connecting portion 71A. The contacting portion 72A contacts the contact 4 (4A) of the receptacle connector 10. The connecting portion 71A and the contacting portion 72A are coupled to each other.

The contacting portion 72A includes a first portion 721, a second portion 722, and coupling portions 723 and 724. The first portion 721 and the second portion 722 are each arranged along the connecting direction CD1, and project toward the receptacle connector 10 from a base near the bottom surface of the plug connector 20. The first portion 721 and the second portion 722 are sandwiched by the first portion 421 and the second portion 422 of the contact 4A when the receptacle connector 10 and the plug connector 20 are fitted together. For example, the first portion 721 contacts the first portion 421, and the second portion 722 contacts the second portion 422. A configuration is possible in which the first portion 721 contacts the second portion 422, and the second portion 722 contacts the first portion 421.

The coupling portion 723 couples a tip of the first portion 721 and a tip of the second portion 722. The coupling portion 724 couples a base of the second portion 722 and the connecting portion 71. The coupling portion 724 extends along a plane perpendicular to the connecting direction CD1 from the base of the second portion 722 to the first portion 721, and is connected to the connecting portion 71. The connecting portion 71 projects outward from an outer surface (surface facing opposite the second portion 722) of the first portion 721 along an extended line of the coupling portion 724. Note that the connecting portion 71 may have any shape provided that attachment to the circuit board 102 is possible, and may have a shape that does not project outward.

Figure 11B:
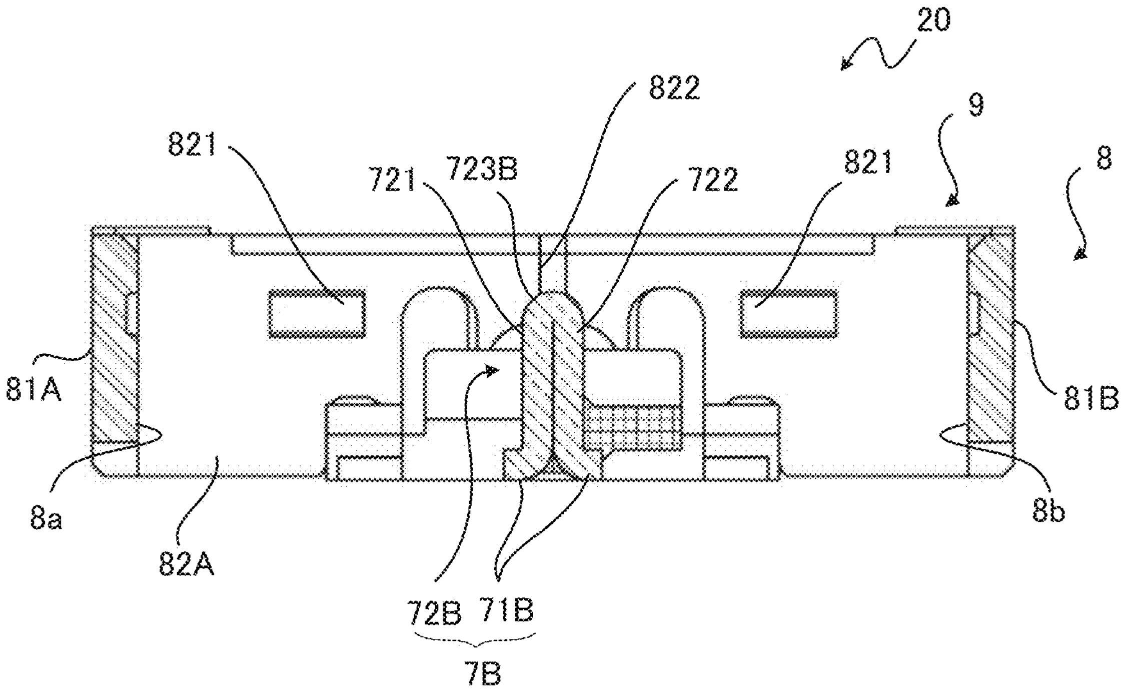
FIG. 11B is a cross-sectional view of a type 2 holding area, taken along line XIB-XIB of FIG. 9.
Figure 12A:
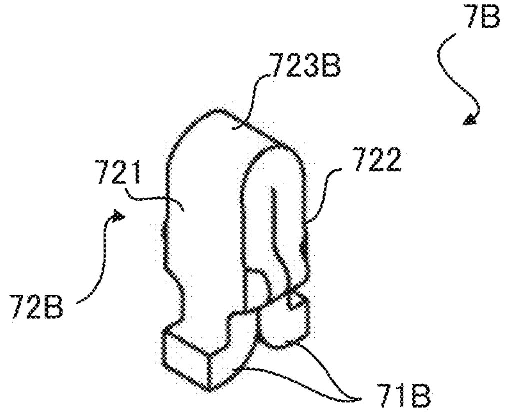
FIG. 12A is a perspective view of a type 2 contact of the plug connector according to Embodiment 1 of the present disclosure.
Figure 12B:
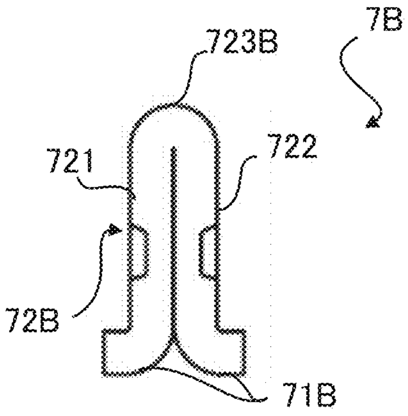
FIG. 12B is side surface view of the type 2 contact.

As illustrated in FIG. 11B that corresponds to a cross-sectional view taken along line XIB of FIG. 9, and FIGS. 12A and 12B, the type 2 contacts 7B each include a connecting portion 71B and a contacting portion 72B. A conductor (for example a signal conductor) of the circuit board 102 is connected to the connecting portion 71B. The contacting portion 72B contacts the contact 4 (4B) of the receptacle connector 10. The connecting portion 71B and the contacting portion 72B are coupled to each other.

The contacting portion 72B is disposed at a position separated from the connecting portion 71B in the connecting direction CD1, which is the normal direction of the installation surface to the circuit board 101. The contacting portion 72B includes a first portion 721, a second portion 722, and a coupling portion 723B. The first portion 721 and the second portion 722 extend from the connecting portion 71B along the connecting direction CD1 toward the receptacle connector 10, in a state in which back surfaces of the first portion 721 and the second portion 722 are in contact with each other. The first portion 721 and the second portion 722 are sandwiched by the first arm 424 and the second arm 425 of the contact 4B when the receptacle connector 10 and the plug connector 20 are fitted together. For example, between the first arm 424 and the second arm 425, the first portion 721 contacts the first arm 424, and the second portion 722 contacts the second arm 425. A configuration is possible in which the first portion 721 contacts the second arm 425, and the second portion 722 contacts the first arm 424.

The coupling portion 723B couples a tip of the first portion 721 and a tip of the second portion 722. One connecting portion 71B extends from the base of the first portion 721 toward a side wall 81A of the shell 8, described later, and the other connecting portion 71B extends from the base of the second portion 722 toward a side wall 81B of the shell 8, described later. Note that the connecting portion 71B may have any shape provided that connection to the circuit board 102 is possible.

Figure 13:
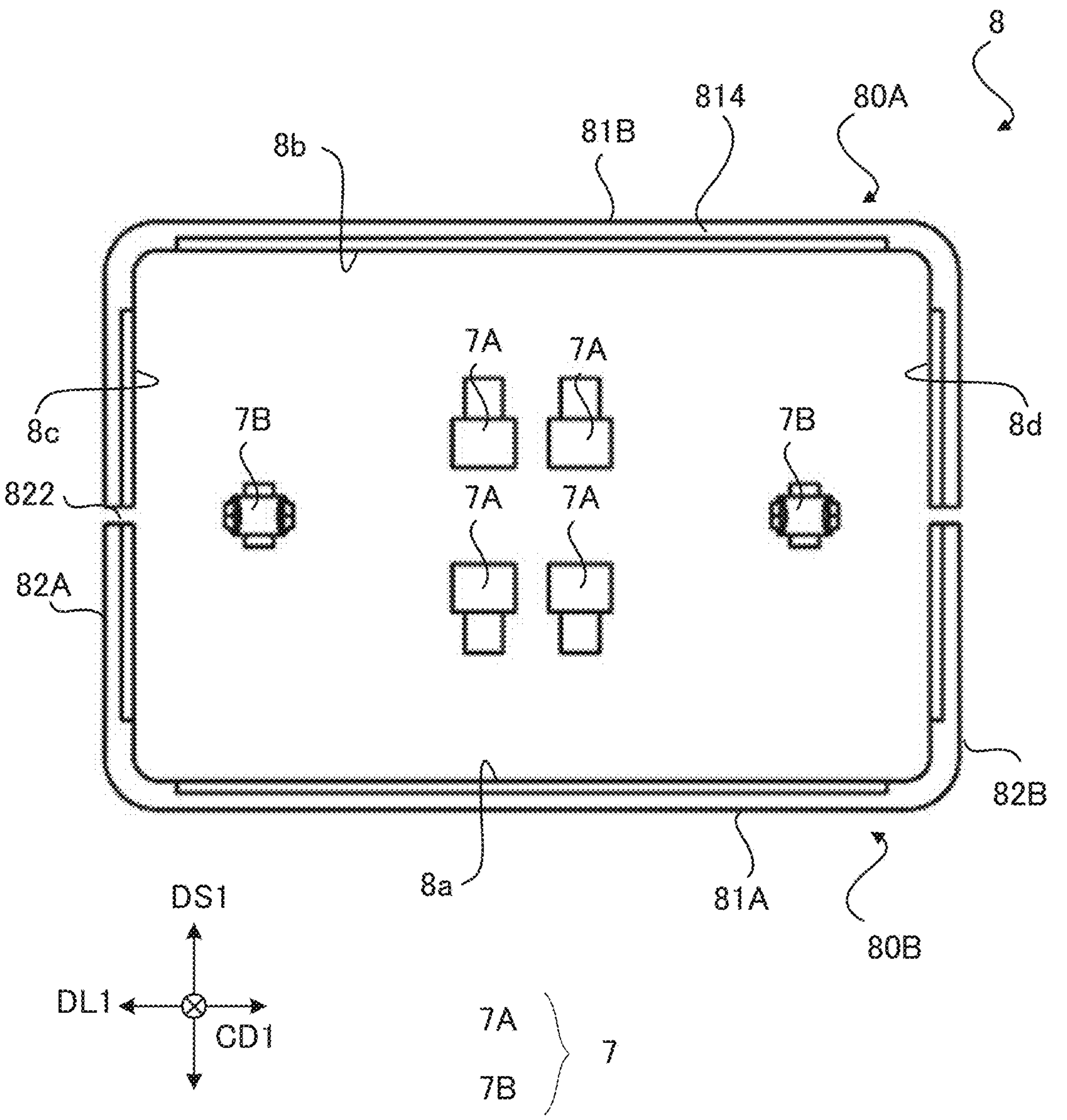
FIG. 13 is a plan view illustrating an arrangement relationship of the contacts and a shell of the plug connector of FIG. 9.

The shell 8 is an electrically conductive member that surrounds the plurality of contacts 7. As illustrated in FIG. 13, when viewed from the receptacle connector 10, the shell 8 surrounds a region having an outer shape similar to a rectangle. This rectangle includes a pair of long sides 8*a* and 8*b* arranged along the long side direction DL1, and a pair of short sides 8*c* and 8*d* arranged along the short side direction DS1. The shell 8 includes a side wall 81A arranged along the long side 8*a*, a side wall 81B arranged along the long side 8*b*, a side wall 82A arranged along the short side 8*c*, and a side wall 82B arranged along the short side 8*d*.

Figure 15:
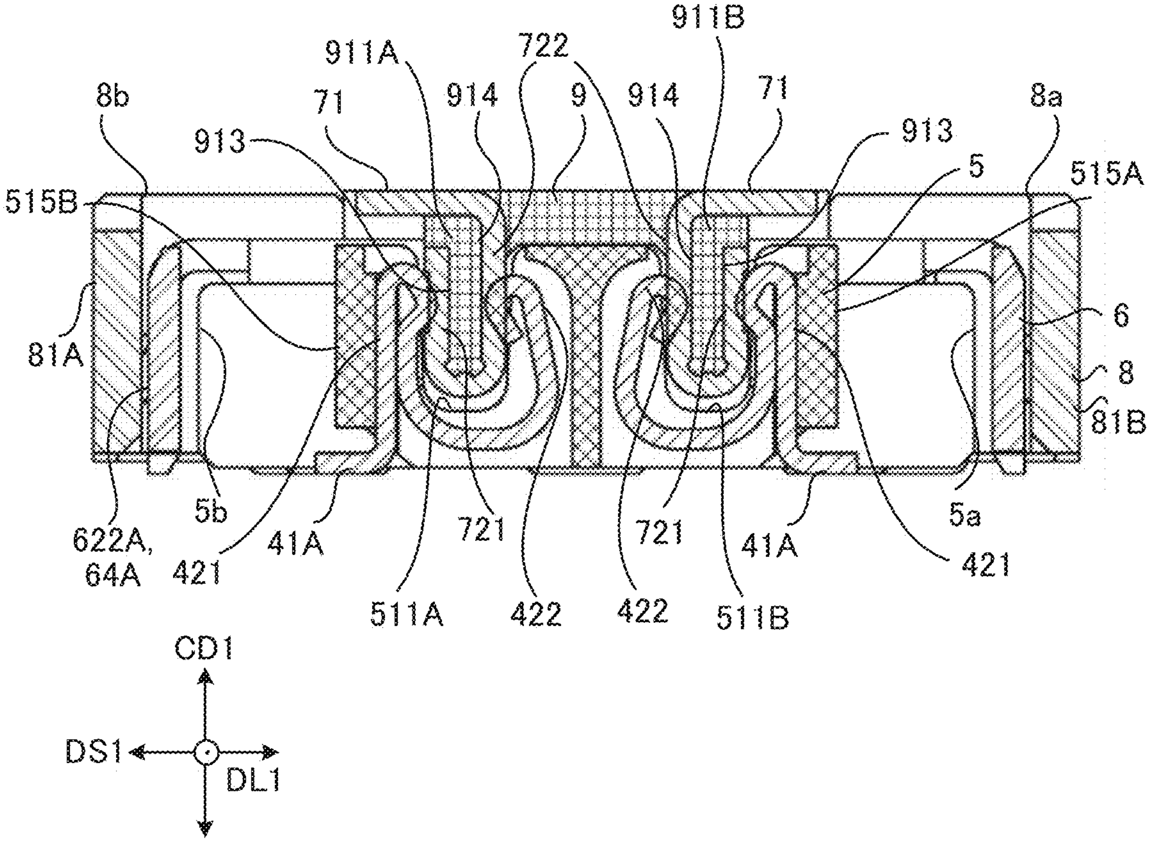
FIG. 15 is a cross-sectional view illustrating a fitted together state of the receptacle connector and the plug connector, in the type 1 holding area.

As illustrated in FIG. 15, in a state in which the plug connector 20 and the receptacle connector 10 are fitted together, the shell 8 is positioned on an outer periphery of the shell 6. In this state, the side wall 81A of the shell 8 contacts the side portion 622A of the surrounding wall 62A, the side portion 622A of the surrounding wall 62B, and the intra-area connection plate 64A of the shell 6. Additionally, the side wall 81B of the shell 8 contacts the side portion 622B of the surrounding wall 62A, the side portion 622B of the surrounding wall 62B, and the intra-area connection plate 64B of the shell 6. Moreover, the side wall 82A of the shell 8 illustrated in FIG. 9 contacts the opposing portion 621 of the surrounding wall 62A of the shell 6 illustrated in FIG. 7. The side wall 82B of the shell 8 illustrated in FIG. 9 contacts the opposing portion 621 of the surrounding wall 62B of the shell 6 illustrated in FIG. 7.

As illustrated in FIG. 9, the side wall 81B of the shell 8 includes four recesses 811 on an inner surface (surface opposing the side wall 81A). Likewise, the side wall 81A includes four non-illustrated recesses 811 on an inner surface (surface opposing the side wall 81B). The recesses 811 respectively engage with the protrusions 626 of the surrounding wall 62A and the surrounding wall 62B of the shell 6.

As illustrated in FIG. 10, each of the side walls 81A and 81B includes an end edge 813 that opposes the circuit board 102, and a ground connecting portion 815 at least one location that projects from the end edge 813 and contacts the circuit board 102. For example, each of the side walls 81A and 81B includes three ground connecting portions 815 arranged in the long side direction DL1. Each of the side walls 81A and 81B is electrically connected to the ground conductor of the circuit board 102 at the ground connecting portions 815.

As illustrated in FIGS. 11A and 11B, the side wall 82A includes a recess 821 at two locations of an inner surface (surface opposing the side wall 82B). These recesses 821 respectively engage with the two protrusions 623 of the surrounding wall 62A of the shell 6 illustrated in FIG. 2. Furthermore, the side wall 82A includes a press fitted portion 822 at a middle position between the recesses 821 and 821 of the inner surface. The press fitter 624 of the surrounding wall 62A is press-fitted into the press fitted portion 822. Likewise, the side wall 82B includes two non-illustrated recesses 821 on an inner surface (surface opposing the side wall 82A). These two recesses 821 engage with the two protrusions 623 of the surrounding wall 62B. Additionally, the side wall 82B includes the press fitted portion 822 at a middle position between the recesses 821 and 821 of the inner surface. The press fitter 624 of the surrounding wall 62B is press-fitted into the press fitted portion 822.

As illustrated in FIG. 10, each of the side walls 82A and 82B includes an end edge 823 that opposes the circuit board 102, and a ground connecting portion 825 at at least one location that projects from the end edge 823 and contacts the circuit board 102. For example, each of the side walls 82A and 82B includes a ground connecting portion 825 at two locations arranged along the short side direction DS1. Each of the side walls 82A and 82B is electrically connected to the ground conductor of the circuit board 102 at the ground connecting portions 825.

As illustrated in FIG. 13, the shell 8 is divided into two shell members 80A and 80B that are arranged in the short side direction DS1 at a middle section (for example, between the two locations of ground connecting portions 825) in the short side direction DS1 of the side wall 82A, and a middle section (for example, between the two locations of ground connecting portions 825) in the short side direction DS1 of the side wall 82B. The shell member 80A includes the side wall 81B, and the shell member 80B includes the side wall 81A.

In one example, each of the shell members 80A and 80B is formed by punching a single layer plate material from a metal thin plate material, and subjecting the obtained plate material to bending or the like. By forming the shell 8 from two members in this manner, ease of machining can be realized. Note that a configuration is possible in which, for example, the shell 8 is formed by punching a single layer plate material from a metal thin plate material, and subjecting the obtained plate material to bending or the like.

The contact holder 9 illustrated in FIG. 9 is an insulating member that holds the plurality of contacts 7 and the shell 8. In one example, the contact holder 9 is formed by insert molding in a state in which the plurality of contacts 7 and the shell 8 are disposed.

Figure 14:
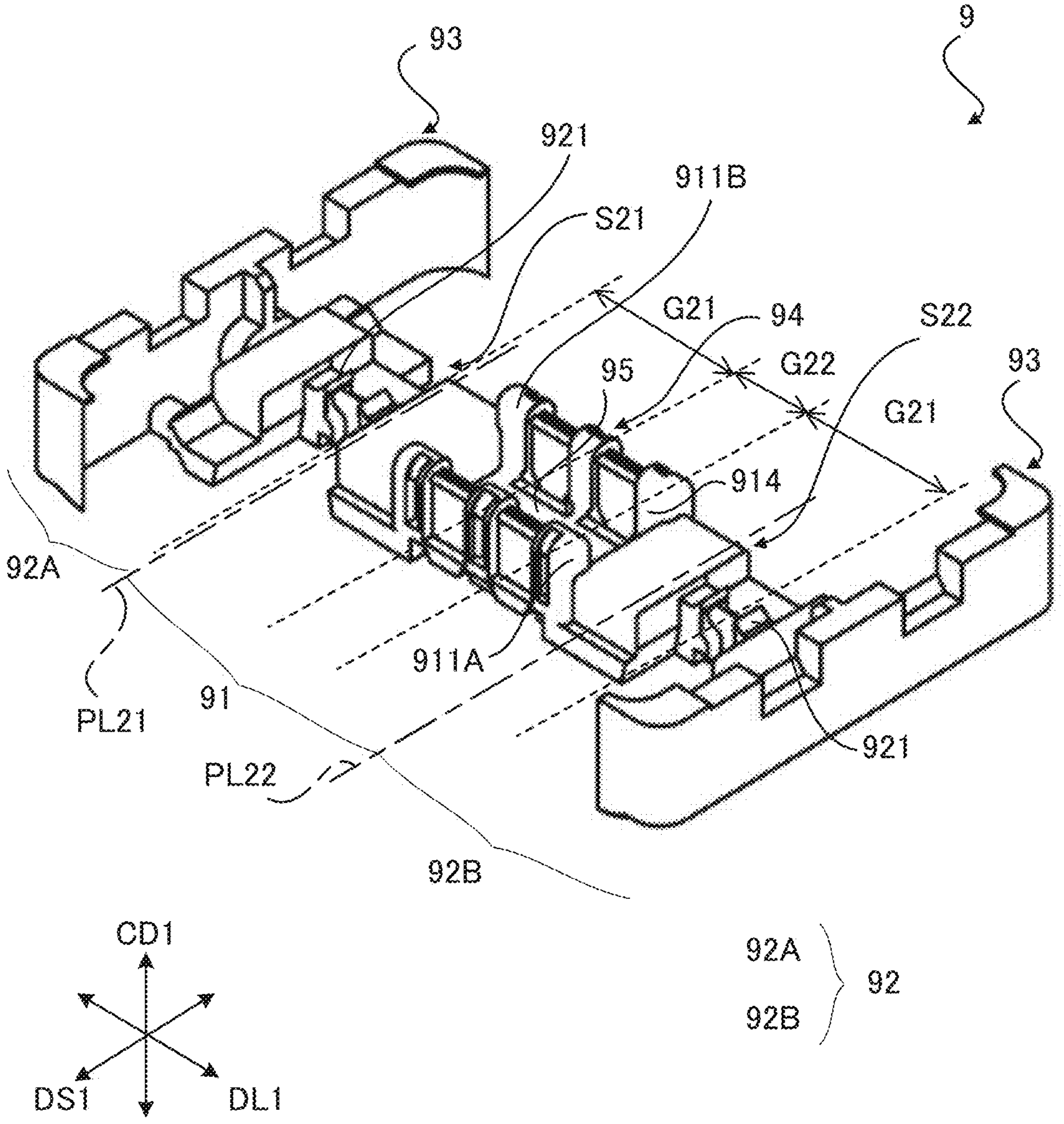
FIG. 14 is a perspective view of a contact holder of the plug connector of FIG. 9.

As illustrated in FIG. 14, the contact holder 9 includes a frame 93 and a main body 94. The frame 93 holds at least a portion (for example, the side walls 82A and 82B) of the shell 8 from the outer periphery side. The main body 94 is disposed between the side walls 82A and 82B, and is coupled to the frame 93. As illustrated in FIG. 10, the main body 94 includes a bottom surface 96 that faces the circuit board 102, and a top surface 95 opposite the bottom surface 96 (see FIG. 14). As illustrated in FIG. 14, the main body 94 is partitioned into a plurality of holding areas on the DS1-DL1 plane.

The plurality of holding areas includes a type 1 holding area 91 and a type 2 holding area 92. The type 1 holding area 91 holds a plurality of the contacts 7. For example, in FIG. 14, the type 1 holding area 91 holds four of the type 1 contacts 7A, and each type 2 holding area 92 holds one contact 7 and does not hold other contacts. In one example, the type 2 holding area 92 holds only one type 2 contact 7B.

The plurality of holding areas may include two type 2 holding areas 92. At least one type 1 holding area 91 may be interposed among the plurality of type 2 holding areas 92. In one example, in FIG. 14, the main body 94 is partitioned into one type 1 holding area 91, and two type 2 holding areas 92 that sandwich the type 1 holding area 91. The type 1 holding area 91 and the two type 2 holding areas 92 are arranged along the long side direction DL1. In the following, the two type 2 holding areas 92 are distinguished as type 2 holding areas 92A and 92B.

The plurality of holding areas may be partitioned by spaces formed in the main body 94. In one example, in FIG. 14, the type 2 holding area 92A and the type 1 holding area 91 are partitioned by a space S21 formed along a boundary PL21 parallel to the short side direction DS1. The type 1 holding area 91 and the type 2 holding area 92B are partitioned by a space S22 formed along a boundary PL22 parallel to the short side direction DS1.

Note that the spaces need not penetrate the main body 94 along the connecting direction CD1, and it is sufficient that at least portions in the connecting direction CD1 are spaces. In one example, the space S21 is formed, between a raised holding portion 921 (described later) of the type 2 holding area 92A and raised holding portions 911A and 911B (described later) of the type 1 holding area 91, in a manner penetrating a portion of the main body 94 and not penetrating the other portion. Additionally, the space S22 is formed, between raised holding portions 911A and 911B (described later) of the type 1 holding area 91 and a raised holding portion 921 (described later) of the type 2 holding area 92B, in a manner penetrating a portion of the main body 94 and not penetrating the other portion.

As illustrated in FIG. 11A, when viewed from the connecting direction CD1, in the contact holder 9, the type 1 contacts 7A are disposed such that portions coupling the connecting portions 71A and the contacting portions 72A (the directions in which the mutually coupled connecting portions 71A and contacting portions 72A are arranged) are arranged in the same direction. In other words, the type 1 contacts 7A are disposed such that the portions where the contacting portions 72A and the contacts 4 of the receptacle connector 10 contact each other are arranged in the same direction. In one example, the contacting portions 72A are disposed such that the portions coupling the connecting portions 71A and the contacting portions 72A are aligned with the short side direction DS1. When viewed from the receptacle connector 10, the contacting portions 72A of all of the contacts 7A are disposed inward from the outer edge of the contact holder 9.

As illustrated in FIG. 9, the type 1 holding area 91 and the type 2 holding areas 92 include raised holding portions that extend along the same direction (for example, the long side direction DL1) and that project from the bottom toward the receptacle connector 10. In each of the type 1 holding area 91 and the type 2 holding areas 92, the contacting portions 72 of all of the contacts 7 are exposed to a side surface of the raised holding portion.

In one example, as illustrated in FIGS. 9 and 14, the type 1 holding area 91 includes two raised holding portions 911A and 911B that are parallel to each other. The raised holding portions 911A and 911B are formed on the main body 94, extend along the long side direction DL1, and project from the top surface (the base) 95 toward the receptacle connector 10. The raised holding portion 911A is positioned near the long side 8*a* of the shell 8, and the raised holding portion 911B is positioned near the long side 8*b* of the shell 8.

The four type 1 contacts 7A held by the type 1 holding area 91 include two type 1 contacts 7A arranged along the raised holding portion 911A, and two type 1 contacts 7A arranged along the raised holding portion 911B. That is, the plurality of type 1 contacts 7A held by the type 1 holding area 91 includes a plurality of type 1 contacts 7A arranged in the long side direction DL1 (arrangement direction perpendicular to the boundaries PL21 and PL22).

Additionally, as illustrated in FIG. 11A, the type 1 contacts 7A arranged along the raised holding portion 911A are mounted on the raised holding portion 911A such that the first portions 721 and the second portions 722 are exposed. As a result of this configuration, each of the type 1 contacts 7A arranged along the raised holding portion 911A is disposed such that, when viewed from the connecting direction CD1, the coupling direction of the connecting portion 71A and the contacting portion 72A is aligned with the short side direction DS1. The second portions 722 of the type 1 contacts 7A penetrate the type 1 holding area 91 from the top surface 95 to the bottom surface 96, and the coupling portions 724 are exposed to the bottom surface 96. The connecting portions 71A project from the coupling portions 724 toward the long side 8*a*. When viewed from the receptacle connector 10, the connecting portions 71A are exposed between the main body 94 and the long side 8*a*. Due to this configuration, the connection states of the connecting portions 71A to the circuit board 102 can be visually confirmed.

Additionally, as illustrated in FIG. 11A, each of the type 1 contacts 7A arranged along the raised holding portion 911B is mounted on the raised holding portion 911B such that the first portion 721 and the second portion 722 are exposed. As a result of this configuration, each of the type 1 contacts 7A arranged along the raised holding portion 911B is disposed such that, when viewed from the connecting direction CD1, the coupling direction of the connecting portion 71A and the contacting portion 72A is aligned with the short side direction DS1. The second portions 722 penetrate the type 1 holding area 91 from the top surface 95 to the bottom surface 96, and the coupling portions 724 are exposed to the bottom surface 96. The connecting portions 71A project from the coupling portions 724 toward the long side 8*b*. When viewed from the receptacle connector 10, the connecting portions 71A are exposed between the main body 94 and the long side 8*b*. Due to this configuration, the connection states of the connecting portions 71A to the circuit board 102 can be visually confirmed.

In the state in which the plug connector 20 and the receptacle connector 10 are fitted together, as illustrated in FIG. 15, the raised holding portion 911A is accommodated in the accommodation groove 511A, and the raised holding portion 911B is accommodated in the accommodation groove 511B. In each of the raised holding portions 911A and 911B, the first portion 721 of the type 1 contact 7A contacts the first portion 421 of the type 1 contact 4A, and the second portion 722 of the type 1 contact 7A contacts the second portion 422 of the type 1 contact 4A.

As illustrated in FIG. 14, the type 2 holding areas 92A and 92B each include one raised holding portion 921. The raised holding portion 921 is formed on the top surface 95 of the main body 94, is formed along the long side direction DL1, and projects from the bottom surface toward the receptacle connector 10. The raised holding portion 921 is positioned in the middle in the short side direction DS1, between the long side 8*a* and the long side 8*b*.

The raised holding portion 921 of the type 2 holding area 92A is partitioned into raised holding portions 911A and 911B of the type 1 holding area 91 by the space S21 arranged along the boundary PL21. The raised holding portion 921 of the type 2 holding area 92B is partitioned into raised holding portions 911A and 911B of the type 1 holding area 91 by the space S22 arranged along the boundary PL22. The one type 2 contact 7B held by each of the type 2 holding areas 92A and 92B is disposed on the raised holding portion 921.

The type 2 contact 7B held by the type 2 holding area 92A is adjacent to the type 1 contacts 7A of the type 1 holding area 91 across the boundary PL21. The type 2 contact 7B held by the type 2 holding area 92B is adjacent to the type 1 contacts 7A of the type 1 holding area 91 across the boundary PL22.

As illustrated in FIG. 14, a gap G21 in the long side direction DL1 (the arrangement direction) of the contacts 7 adjacent across the boundaries PL21 and PL22 is larger than a gap G22 of the contacts 7 adjacent along the long side direction DL1 in the type 1 holding area 91.

Figure 16:
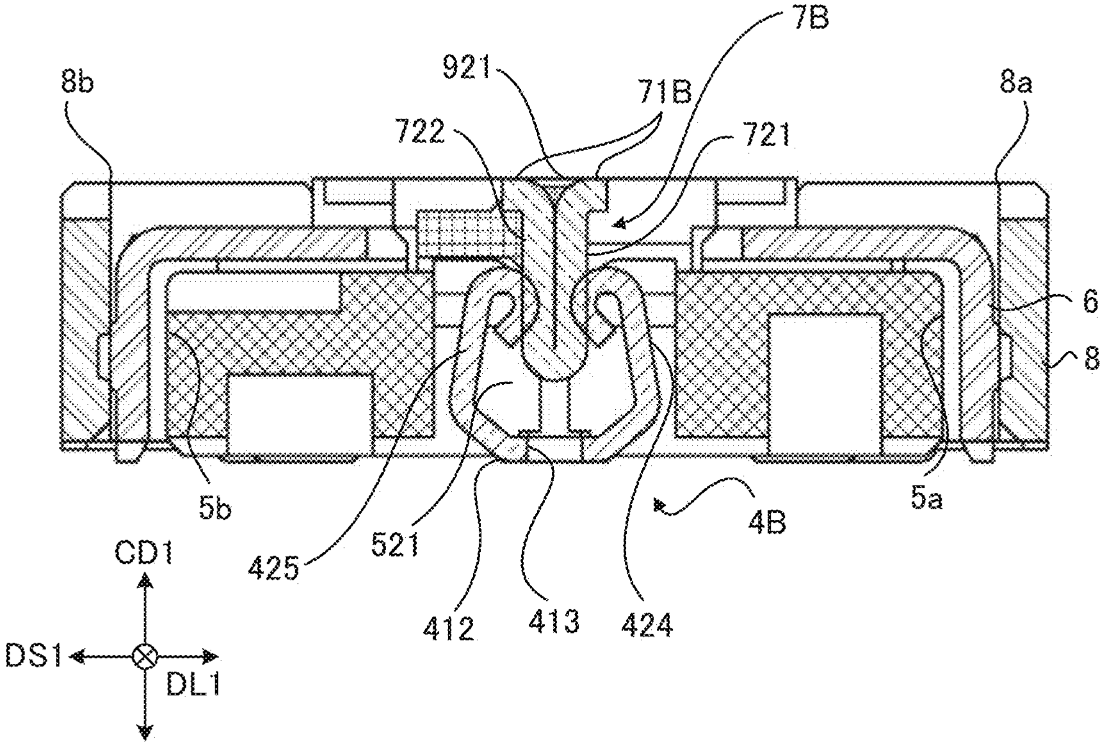
FIG. 16 is a cross-sectional view illustrating a fitted together state of the receptacle connector and the plug connector, in the type 2 holding area.

As illustrated in FIG. 16, in the state in which the plug connector 20 and the receptacle connector 10 are fitted together, the raised holding portions 921 are accommodated in the accommodation grooves 521. The first portions 721 of the type 2 contacts 7B contact the first arms 424 of the type 2 contacts 4B, and the second portions 722 of the type 2 contacts 7B contact the second arms 425 of the type 2 contacts 4B.

Figure 17:
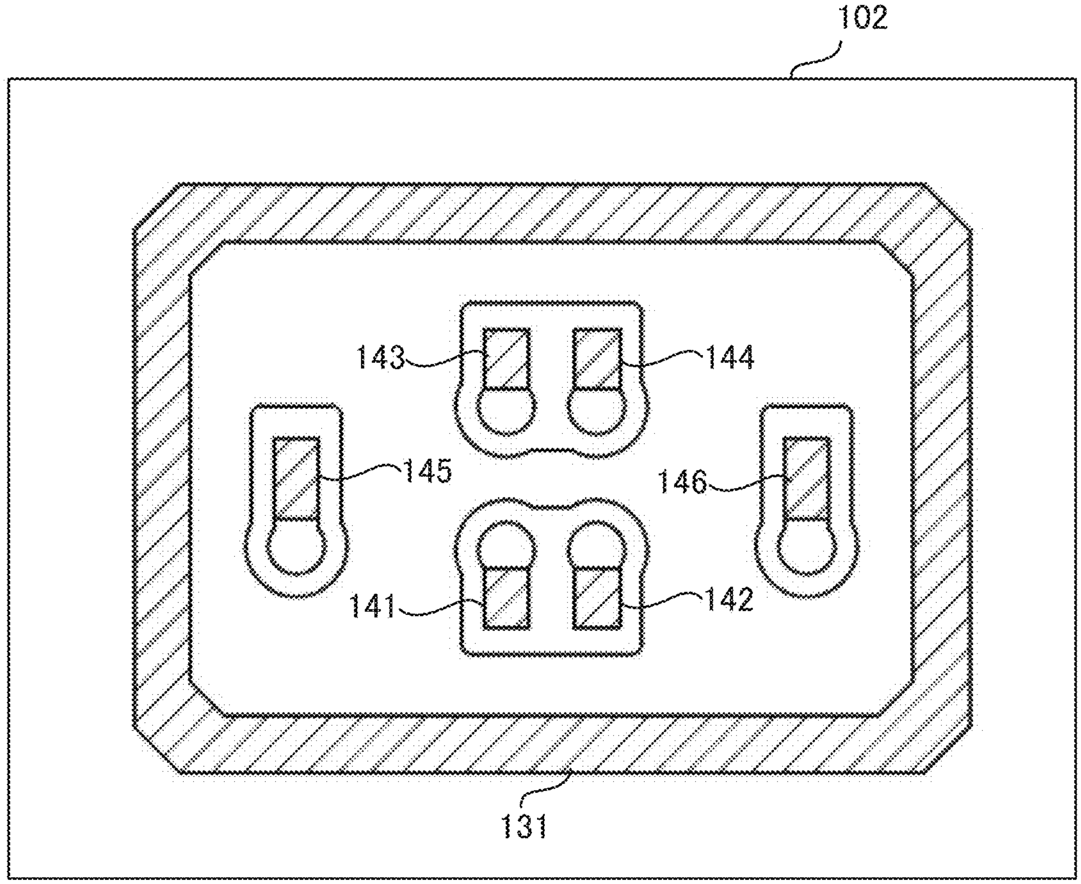
FIG. 17 is a plan view illustrating an arrangement of exposed conductor portions of the circuit board to which the plug connector of FIG. 9 is attached.

The plug connector 20 configured as described above is attached to the circuit board 102 with the bottom surface 96 facing the circuit board 102. As illustrated in FIG. 17, the circuit board 102 includes a ground conductor exposer 131, and signal conductor exposers 141, 142, 143, 144, 145, and 146.

The ground conductor exposer 131 is a portion where the ground conductor of the circuit board 102 is exposed. The ground connecting portions 815 at three locations of the side wall 81A, the ground connecting portions 815 at three locations of the side wall 81B, the ground connecting portions 825 at two locations of the side wall 82A, and the ground connecting portions 825 at two locations of the side wall 82B are connected to the ground conductor exposer 131 by solder or the like.

The signal conductor exposers 141, 142, 143, 144, 145, and 146 are portions where the signal conductors of the circuit board 102 are exposed. The connecting portions 71A of the four type 1 contacts 7A and the connecting portions 71B of the two type 2 contacts 7B are respectively connected to the signal conductor exposers 141, 142, 143, 144, 145, and 146 by solder or the like.

As described above, with the receptacle connector 10 and the plug connector 20, the type 1 contacts 4A and 7A and the type 2 contacts 4B and 7B are respectively disposed having line symmetry with respect to the center lines C1 and C2 (that is, having point symmetry with respect to the point CP). Furthermore, the contacting portions 42B and 72B of the type 2 contacts 4B and 7B contact the type 2 contacts 7B and 4B of the mating connector at positions separated from the connecting portions 41B and 71B in the normal direction of the bottom surfaces facing the circuit boards 101 and 102. As such, even when the orientations of the receptacle connector 10 and the plug connector 20 are reversed, the contact positions of the type 1 contacts 4A and 7A and the type 2 contacts 4B and 7B do not change from before to after the reversal. Accordingly, the plug connector 20 can be rotated 180° on a plane parallel to the receptacle connector 10 and be fitted together with the receptacle connector 10.

Therefore, even when reverse mounted, the contact positions of the type 2 contacts 4B and 7B do not change from before to after the reversal. Accordingly, the receptacle connector 10 can be reverse mounted on the circuit board 101. Also, the plug connector 20 can be reverse mounted on the circuit board 102.

The first portions 431 and the second portions 432 of the type 2 contacts 4B engage with the contact holder 5. Accordingly, effects on the connection state between the connecting portions 41B and the circuit board 101 can be suppressed, even when the plug connector 20 is repeatedly attached and detached.

The type 2 contacts 4B and 7B are disposed in the type 2 holding areas 52 and 92 that differ from the type 1 holding areas 51 and 91 in which the type 1 contacts 4A and 7A are disposed. As a result, crosstalk noise can be suppressed.

For example, a configuration is possible in which the type 2 contacts 4B and 7B are contacts that transmit signals of frequencies higher than those of the signals that the type 1 contacts 4A and 4B transmit. Crosstalk noise can be suppressed in this case as well due to the contacts 4B and 7B that transfer the high-frequency signals being disposed in the type 2 holding areas 52A, 52B, 92A, and 92B, separated from the other contacts 4A and 7A.

In the present embodiment, the type 1 holding area 51 and the two type 2 holding areas 52A and 52B are partitioned by the spaces S11 and S12. Additionally, the type 1 holding area 91, and the two type 2 holding areas 92A and 92B that sandwich the type 1 holding area 91 are partitioned by the spaces S21 and S22. Accordingly, as described above, crosstalk noise can be suppressed. Furthermore, in this case, noise can be more reliably suppressed due to the disposal of electrically conductive members such as the shell 6, for example, in the spaces S11, S12, S21, and S22.

Embodiment 2

A connector unit 2 according to Embodiment 2 differs from the connector unit 1 of Embodiment 1 in that, instead of the receptacle connector 10 including the type 2 contact 4B, a receptacle connector 11 that includes a type 2 contact 4B1 is used.

Figure 18A:
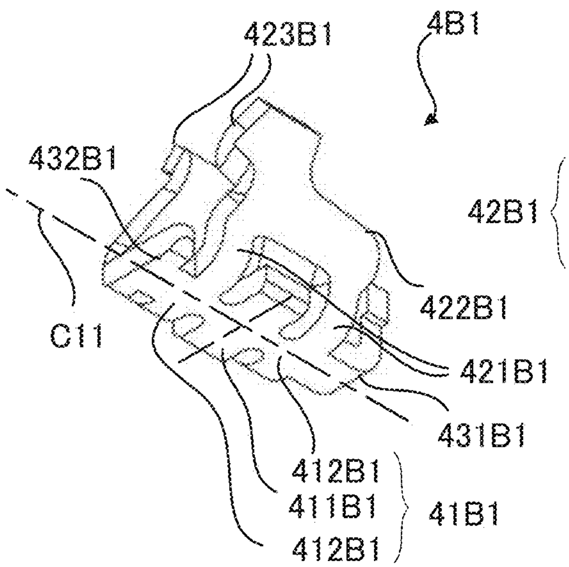
FIG. 18A is a perspective view of a contact of a receptacle connector according to Embodiment 2 of the present disclosure.
Figure 18B:
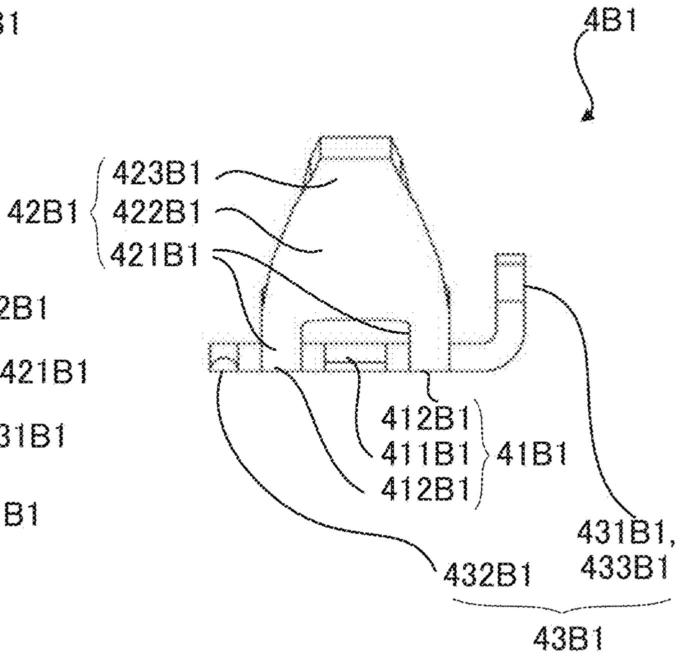
FIG. 18B is side surface view of the contact.
Figure 18C:
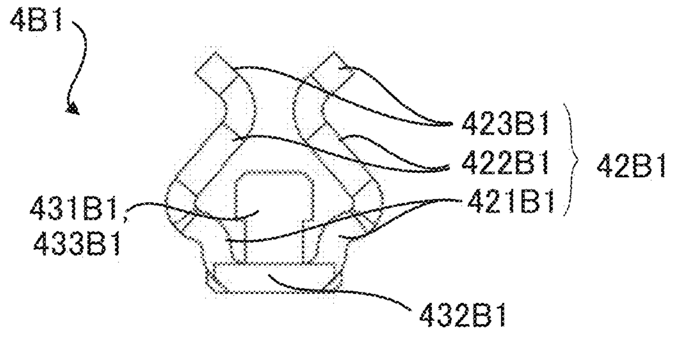
FIG. 18C is front view of the contact.

As illustrated in FIGS. 18A to 18C, the type 2 contact 4B1 includes a connecting portion 41B1, a contacting portion 42B1, and an engaged portion 43B1.

The connecting portion 41B1 includes a base 411B1 connected to a conductor of the circuit board 101, and two communicating portions 412B1 that extend in a direction orthogonal to a direction in which the base 411B1 extends. When viewed from above, the base 411B1 is formed in a substantially rectangular plate-like shape, and a long axis of the base 411B1 is disposed in a direction in which an exposed conductor portion of the circuit board 101 extends. The engaged portion 43B1 is provided at the end of each communicating portion 412B1.

Figure 19:
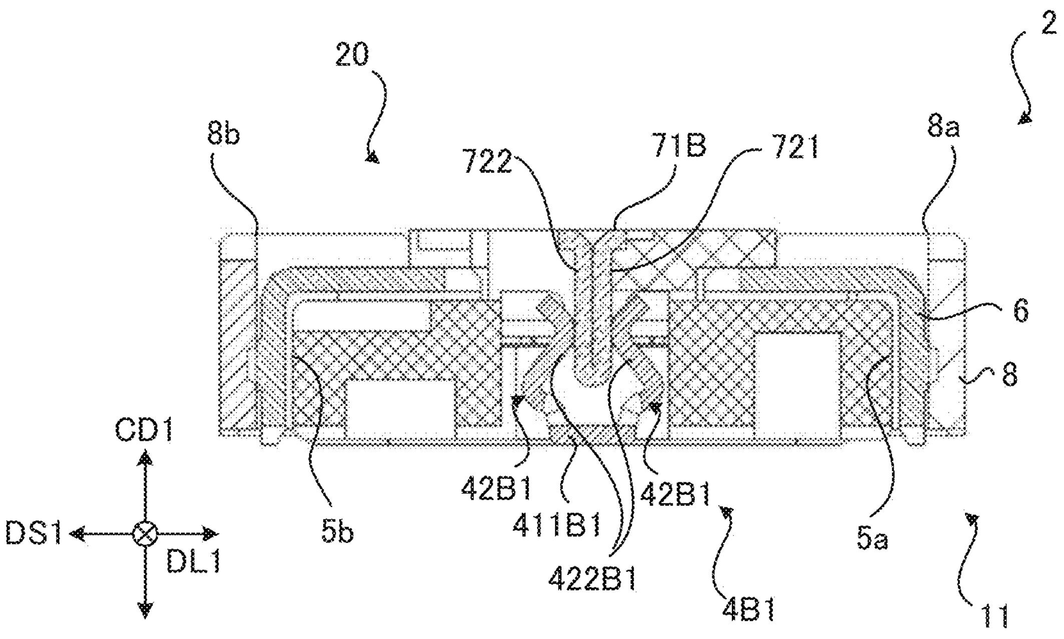
FIG. 19 is a cross-sectional view illustrating a fitted together state of the receptacle connector and a plug connector, in a type 2 holding area, of Embodiment 2 of the present disclosure.

A contacting portion 42B1 is formed in a line symmetrical shape with respect to a center axis C11. The contacting portion 42B1 includes springs 421B1, sandwichers 422B1, and guiders 423B1. The springs 421B1 extend so as to rise from the communicating portion 412B1 in the connecting direction CD1, straddling the base 411B1 and the exposed conductor portion of the connected circuit board 101. The pair of sandwichers 422B1 extend, in directions that separate from each other, from the springs 421B1 toward the plug connector 20, and then extend so as to approach each other. The pair of guiders 423B1 extend, in directions that separate from each other, from the sandwichers 422B1 toward the plug connector 20. The contacting portions 42B1 are formed such that a width decreases with proximity to the guiders 423B1. As illustrated in FIG. 19, the sandwichers 422B1 sandwich the contact 7 of the plug connector 20 when the receptacle connector 11 and the plug connector 20 are fitted together.

The engaged portion 43B1 includes a first portion 431B1 and a second portion 432B1. The first portion 431B1 includes a substantially T-shaped protrusion 433B1 that rises along the connecting direction CD1. The second portion 432B1 includes a portion extending in a substantial T shape.

Figure 20:
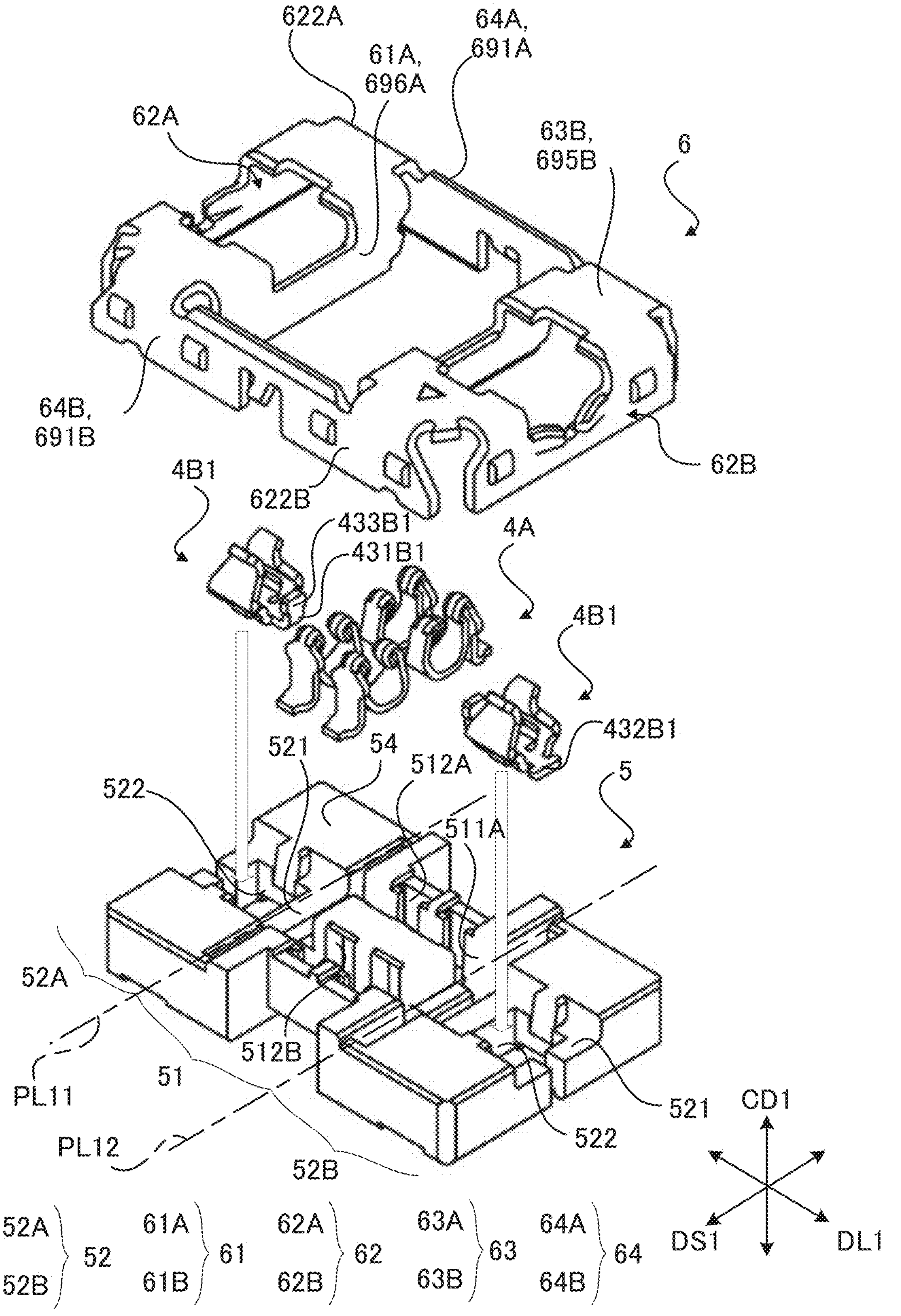
FIG. 20 is an exploded perspective view illustrating a positional relationship between a type 2 contact and a contact holder of Embodiment 2 of the present disclosure.

As illustrated in FIG. 20, the substantially T-shaped protrusion 433B1 of the first portion 431B1 is engaged near the type 1 holding area 51 of the contact holder 5. The second portion 432B1 is disposed such that the T-shaped portion is near the surrounding wall 62 of the shell 6, and causes the substantially T-shaped portion to engage with the contact holder 5.

Thus, according to the present embodiment, the type 2 contacts 4B1 and 7B each are disposed on the center line C1 of the type 1 contacts 4A and 7A in the lateral direction of each connector and, also, the contacting portions 42B1 of the type 2 contacts 4B1 and 7B contact the type 2 contacts 7B and 4B1 of the mating connector at positions separated, in the normal direction of the bottom surfaces that contact the circuit boards 101 and 102, from the connecting portions 41B1 and 71B. As such, even when reverse mounted, the contact positions of the type 2 contacts 4B1 and 7B do not change from before to after the reversal. Therefore, the receptacle connector 11 can be reverse mounted on the circuit board 101. Also, the plug connector 20 can be reverse mounted on the circuit board 102. The springs 421B1 of the type 2 contacts 4B1 are formed so as to rise from the communicating portion 412B1, straddling the base 411B1 and the exposed conductor portion of the connected circuit board 101. As such, the solder or the like used to connect the base 411B to the exposed conductor portion can be prevented from obstructing the operations of the springs 421B1. Additionally, the long side of the connecting portion 41B1 is disposed overlapping the exposed conductor portion of the circuit board 101. As such, the connection between the connecting portion 41B1 and the circuit board 101 can be made more reliably, and signals can be stably sent and received.

Embodiment 3

A connector unit 3 according to Embodiment 3 differs from the connector unit 1 of Embodiment 1 in that, instead of the receptacle connector 10, a receptacle connector 12 that includes a type 2 contact 4B2 is used.

Figure 21A:
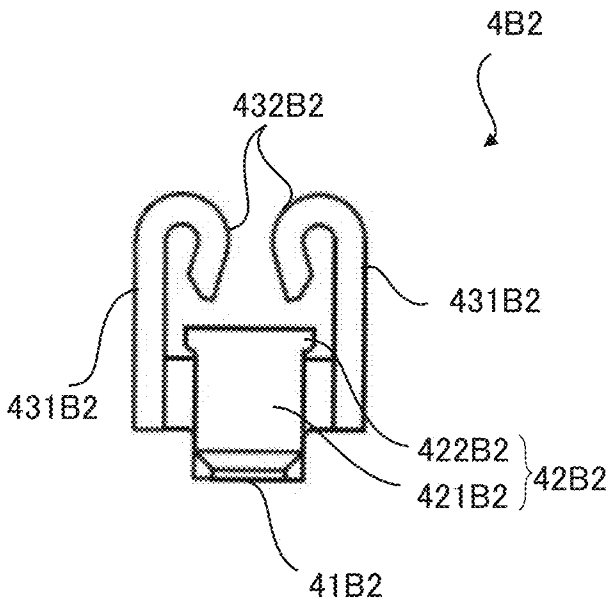
FIG. 21A is a front view of a contact of a receptacle connector according to Embodiment 3 of the present disclosure.
Figure 21B:
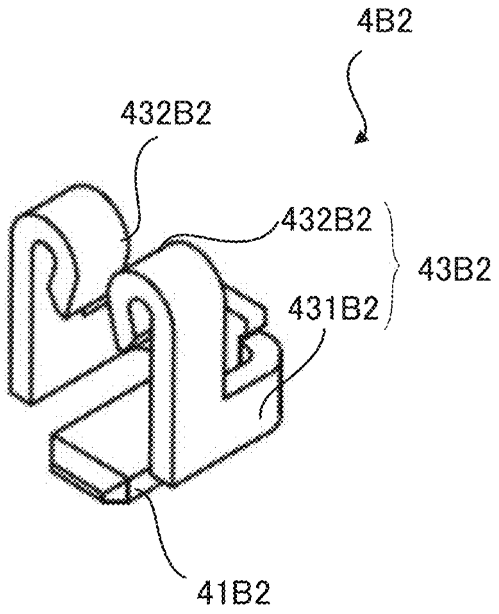
FIG. 21B is a perspective view of the contact.

As illustrated in FIGS. 21A and 21B, the type 2 contact 4B2 includes a connecting portion 41B2, a base 42B2, and contacting portions 43B2.

The connecting portion 41B2 is formed in a substantially rectangular plate-like shape. The long side of the connecting portion 41B2 is disposed in a direction in which an exposed conductor portion of the circuit board 101 extends.

The base 42B2 includes a main body 421B2, and an engaged portion 422B2. The main body 421B2 is a substantially rectangular plate-like body that rises along the connecting direction CD1 from an end of the connecting portion 41B2. The engaged portion 422B2 is a substantially T-shaped plate-like body that is formed on an end of the main body 421B2. The base 42B2 is disposed and engaged near the type 1 holding area 51 of the contact holder 5.

The contacting portions 43B2 are formed in a line symmetrical shape with respect to the connecting portion 41B2. Each of the contacting portions 43B2 includes a vertical portion 431B2 and a sandwicher 432B2.

Figure 22:
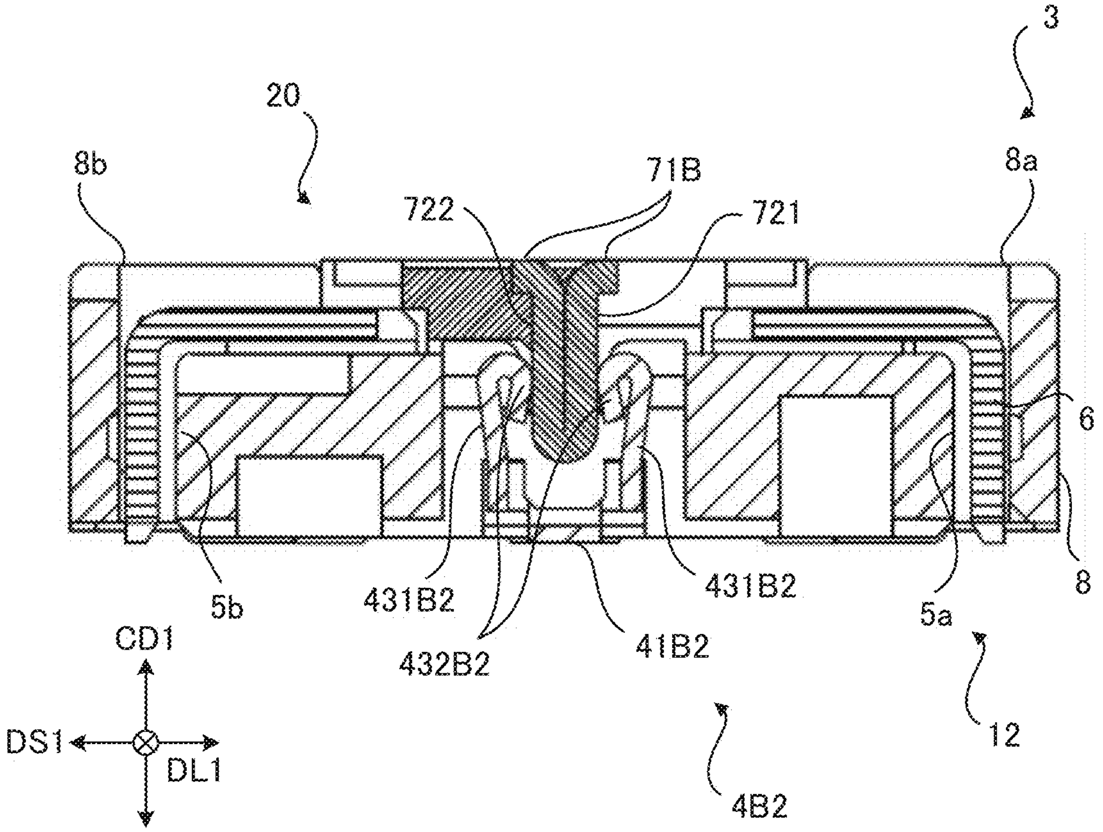
FIG. 22 is a cross-sectional view illustrating a fitted together state of the receptacle connector and a plug connector, in a type 2 holding area, of Embodiment 3 of the present disclosure.

The vertical portions 431B2 extend bending, from both sides of the main body 421B2, in a direction orthogonal to the main body 421B2 and then in the connecting direction CD1 and, when viewed from the side, are substantially L-shaped or reverse L-shaped members. The sandwichers 432B2 are members that are bent back from the vertical portions 431B2 toward the circuit board 101. As illustrated in FIG. 22, the sandwichers 432B2 sandwich the contact 7 of the plug connector 20.

Thus, according to the receptacle connector 12 and the plug connector 20, the type 2 contacts 4B2 and 7B are disposed on the center line C1 of the type 1 contacts 4A and 7A and, also, the contacting portions of the type 2 contacts 4B2 and 7B contact the type 2 contacts 7B and 4B2 of the mating connector at positions separated, in the normal direction of the bottom surfaces that contact the circuit boards 101 and 102, from the connecting portions 41B2 and 71B that connect to the circuit boards 101 and 102. As such, even when the receptacle connector 12 or the plug connector 20 is reverse mounted, the positions of the type 2 contacts 4B2 and 7B do not change from before to after the reversal. Therefore, the receptacle connector 12 can be reverse mounted on the circuit board 101. Also, the plug connector 20 can be reverse mounted on the circuit board 102. Additionally, since the contacting portions 43B2 are connected to the connecting portion 41B2 via the base 42B2, the type 2 contacts 4B2 can suppress effects on the connection state between the connecting portion 41B2 and the circuit board 101, even when the plug connector 20 is repeatedly attached and detached.

OTHER EMBODIMENTS

Embodiments of the present disclosure are described above, but the present disclosure is not limited by the embodiments described above.

Figure 23:
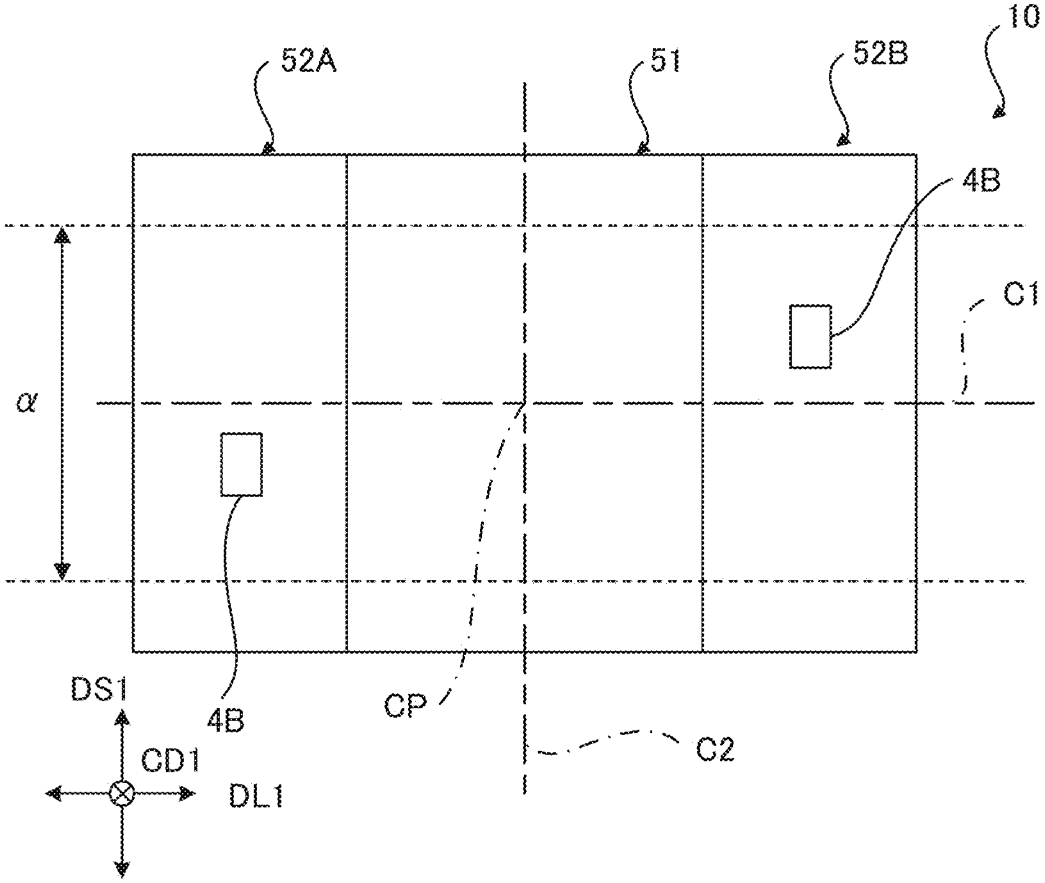
FIG. 23 is a drawing illustrating an example of positions in a region α at which a type 2 contact is arranged, according to another embodiment.

For example, in Embodiment 1, the type 2 contacts 4B and 7B are each disposed on the center line C1 of the type 1 contacts 4A and 7A in the lateral direction of the connector and, also, are disposed having point symmetry with respect to the intersection CP. However, the present disclosure is not limited thereto. As illustrated in FIG. 23, it is sufficient that the type 2 contacts 4B and 7B are disposed having point symmetry with respect to the intersection CP, and need not be disposed on the center line C1.

Specifically, it is sufficient that the connecting portions 41B and 71B of the type 2 contacts 4B and 7B are disposed having point symmetry with respect to the intersection CP. Additionally, it is sufficient that the connecting portions 41B and 71B of the type 2 contacts 4B and 7B are disposed on the center line C1, and the contacting portions 42B and 72B of the type 2 contacts 4B and 7B need not be disposed on the center line C1.

That is, when the connecting portions 41B and 71B of the type 2 contacts 4B and 7B and the contacting portions 42B and 72B of the type 2 contacts 4B and 7B are separated in the normal directions of the circuit boards, the connecting portions 41B and 71B and the contacting portions 42B and 72B may be separated when viewed from above.

Note that the connecting portions 41B and 71B of the type 2 contacts 4B and 7B and the contacting portions 42B and 72B of the type 2 contacts 4B and 7B being separated in the normal directions of the circuit boards includes a portion of the connecting portions 41B and 71B and a portion of the contacting portions 42B and 72B overlapping when viewed from above. However, as illustrated in FIGS. 2B and 3, it is desirable that the type 2 contacts 4B and 7B are disposed in the region α in which the sets of type 1 contacts 4A and 7A are disposed in the lateral direction of the connectors.

In Embodiment 1, the type 2 contacts 4B and 7B are disposed having point symmetry with respect to the intersection CP. Due to this, even when reverse mounted, the connecting portions 41B of the type 2 contacts 4B are disposed on the signal conductor exposers 125 and 126. Additionally, the connecting portions 71B of the type 2 contacts 7B are disposed on the signal conductor exposers 175 and 176. Note that "symmetrical" need not be limited to the strict sense of the term, and it is sufficient provided that the degree of symmetry allows for i) reverse mounting of the receptacle connector 11 (12, 13) on the circuit board 101, ii) reverse mounting of the plug connector 20 on the circuit board 102, and iii) fitting together of the receptacle connector 11 (12, 13) and the plug connector 20.

For example, a configuration is possible in which the type 2 contacts 4B and 7B are not disposed having point symmetry with respect to the intersection CP in the region α in which the sets of type 1 contacts 4A and 7A oppose each other in the lateral direction of the connectors.

Figure 24:
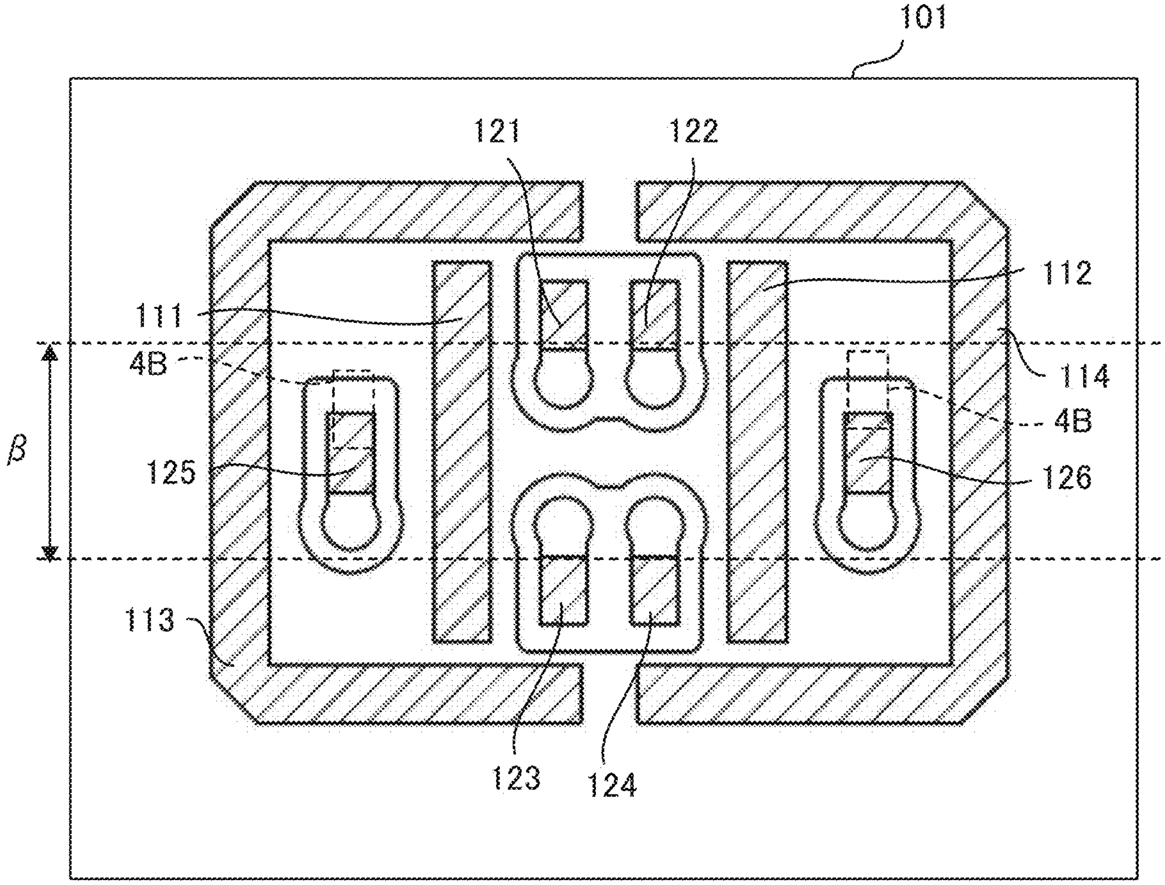
FIG. 24 is a drawing illustrating an example in which positions, in a region β at which the type 2 contact is arranged, are projected on a circuit board, according to another embodiment.

For example, even if the position of the connecting portion 41B of one type 2 contact 4B when the receptacle connector 11 is disposed at an angle of 0° differs from the position of the connecting portion 41B of another type 2 contact 4B when reversed 180°, it is sufficient that the signal conductor exposers 125 and 126 are formed having sizes that enable the connecting of the connecting portions 41B of both of the type 2 contacts 4B (see FIG. 24).

Likewise, for example, even if the position of the connecting portion 71B of one type 2 contact 7B when the plug connector 20 is disposed at an angle of 0° differs from the position of the connecting portion 71B of another type 2 contact 7B when reversed 180°, it is sufficient that the signal conductor exposers 175 and 176 are formed having sizes that enable the connecting of the connecting portions 71B of both of the type 2 contacts 7B.

The positions of the type 2 contacts 4B and 7B are variable, provided that the receptacle connector 11 and the plug connector 20 can be fitted together when one of the receptacle connector 11 and the plug connector 20 is at 0° or at 180° rotation.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2019-239999, filed on Dec. 28, 2019, the entire disclosure of which is incorporated by reference herein.

REFERENCE SIGNS LIST

- 1, 2, 3 Connector unit
- 4, 7 Contact
- 4A, 7A Type 1 contact
- 4B, 4B1, 4B2, 7B Type 2 contact
- 5, 9 Contact holder
- 6 Shell
- 10, 11, 12 Receptacle connector (connector)
- 20 Plug connector (mating connector)
- 41, 41A, 41B, 41B1, 41B2, 71, 71A, 71B Connecting portion
- 411, 411B1, 42B2 Base
- 412, 641 Projection
- 412B1 Communicating portion
- 413 Hole
- 42A, 42B, 41B1, 43B2, 72, 72A, 72B Contacting portion
- 421, 431B1, 721 First portion
- 421B1 Spring
- 421B2, 94 Main body
- 422, 431B2, 432B1, 722 Second portion
- 422B1, 432B2 Sandwicher
- 423B1 Guider
- 424 First arm
- 425 Second arm
- 422B2, 43B, 43B1 Engaged portion
- 431B1 Vertical portion
- 433B1 Protrusion
- 51, 91 Type 1 holding area
- 511A, 511B, 521 Accommodation groove
- 512A, 512B, 522 Contact accommodator
- 515A, 515B, 525, 811, 821 Recess
- 52, 52A, 52B, 92, 92A, 92B Type 2 holding area
- 61, 61A, 61B Partition wall
- 611 End edge (edge)
- 62, 62A, 62B Surrounding wall
- 621 Opposing portion
- 622A, 622B Side portion
- 623, 626 Protrusion
- 624 Press fitter
- 625, 627, 642, 813, 823 End edge
- 63, 63A, 63B In-area connection plate (in-area connecting portion)
- 631 Opening
- 64, 64A, 64B Intra-area connection plate (intra-area connecting portion)
- 691A, 691B, 692A, 692B Outer wall
- 695A, 695B Top plate
- 696A, 696B Inner wall
- 723, 723B, 724 Coupling portion
- 81A, 81B, 82A, 82B Side wall
- 815, 825 Ground connecting portion
- 822 Press fitted portion
- 911A, 911B, 921 Raised holding portion
- 93 Frame
- 101, 102 Circuit board
- 111, 112, 113, 114, 131 Ground conductor exposer
- 121, 122, 123, 124, 125, 126, 141, 142, 143, 144, 145, 146, 175, 176 Signal conductor exposer
- CD1 Connecting direction
- DL1 Long side direction
- D1S1 Short side direction

What is claimed is:

1. A connector that is installed on a circuit board and that is electrically connected to a circuit of the circuit board, the connector comprising:

a set of type 1 contacts that is disposed in a type 1 holding area, the type 1 contacts being disposed facing each other; and a type 2 contact that is disposed in each of two type 2 holding areas that sandwich the type 1 holding area, wherein when viewed from above, at least a portion of each of the type 2 contact is disposed in a range obtained by extending, in a first direction in which the type 1 holding area and the two type 2 holding areas are arranged, a region in which the set of type 1 contacts oppose each other in a second direction orthogonal to the first direction, each of the type 2 contact includes a connecting portion that is connected to the circuit of the circuit board, and a contacting portion that is disposed at a position separated from the connecting portion in a normal direction of an installation surface to the circuit board, and that contacts a terminal of a mating connector, when viewed from above, all of the type 1 contacts and all of the type 2 contacts are disposed having point symmetry with respect to one predetermined point, and the connecting portion and the contacting portion are disposed having point symmetry with respect to the one predetermined point, and the connecting portion is disposed on an extended line of a center line of the set of type 1 contacts that oppose each other, the center line passing through the one predetermined point.

2. The connector according to claim 1, wherein the type 2 contact is a contact that transmits a signal of a higher frequency than a signal that the type 1 contacts transmit.

3. The connector according to claim 1, wherein the one predetermined point is disposed inward of an outer edge of the type 1 holding area.

4. A connector that is installed on a circuit board and that is electrically connected to a circuit of the circuit board, the connector comprising:

a set of type 1 contacts that is disposed in a type 1 holding area, the type 1 contacts being disposed facing each other; and a type 2 contact that is disposed in each of two type 2 holding areas that sandwich the type 1 holding area, wherein when viewed from above, at least a portion of each of the type 2 contact is disposed in a range obtained by extending, in a first direction in which the type 1 holding area and the two type 2 holding areas are arranged, a region in which the set of type 1 contacts oppose each other in a second direction orthogonal to the first direction, each of the type 2 contact includes a connecting portion that is connected to the circuit of the circuit board, and a contacting portion that is disposed at a position separated from the connecting portion in a normal direction of an installation surface to the circuit board, and that contacts a terminal of a mating connector, and the connecting portion and the contacting portion are disposed in the second direction with line symmetry, having an extended line of a center line of the set of type 1 contacts as an axis of symmetry, and the connecting portion is disposed on the extended line.

5. The connector according to claim 1, wherein one of the type 2 contact is disposed in each of the type 2 holding areas, and when viewed from above, is disposed on an extended line of a center line of the set of type 1 contacts that oppose each other in the second direction.

6. The connector according to claim 1, wherein one of the type 2 contact is disposed in each of the type 2 holding areas.

7. The connector according to claim 1, wherein the connecting portion of each of the type 2 contact is formed along the first direction from a base of the contacting portion.

8. The connector according to claim 1, further comprising:

at least another set of type 1 contacts that is disposed in the type 1 holding area, and the type 1 contacts being disposed facing each other, wherein one type 1 contact of the set of type 1 contacts is disposed on a same straight line arranged along the first direction as one type 1 contact of the other set of type 1 contacts.

9. The connector according to claim 1, wherein the type 1 holding area and the two type 2 holding areas sandwiching the type 1 holding area are partitioned by a space formed between a type 1 contact holder that holds the type 1 contacts and a type 2 contact holder that holds the type 2 contact.

10. The connector according to claim 1, wherein each of the type 1 contacts includes a connecting portion that is connected to the circuit of the circuit board, a contacting portion that is disposed at a position separated, from the connecting portion in the normal direction of the installation surface, and that contacts the mating connector, and a coupling portion that couples the connecting portion and the contacting portion, and a plurality of the type 1 contacts is disposed such that coupling directions of the contacting portion and the connecting portion by the coupling portion are arranged in a same direction.

11. The connector according to claim 10, wherein each of the type 1 holding area and the type 2 holding areas includes a raised holding portion that projects from a base toward the mating connector, and in each of the type 1 holding area and the type 2 holding areas, the contacting portion of the corresponding contact is exposed to a side surface of the raised holding portion.

12. The connector according to claim 10, wherein each of the type 1 holding area and the type 2 holding areas includes an accommodation groove, and in each of the type 1 holding area and the type 2 holding areas, contacting portions of all contacts are disposed so as to be exposed by the accommodation grooves.

13. The connector according to claim 1, wherein a plurality of engaged portions with which the type 2 contact engages is provided.

14. The connector according to claim 1, wherein the connecting portion of the type 2 contact may include a hole that enables visual confirmation of a connection state between the circuit board and the connecting portion.

15. The connector according to claim 1, wherein a projection is provided on the installation surface in the connecting portion of the type 2 contact.

16. A connector unit, comprising:

a connector that is installed on a first circuit board and that is electrically connected to a circuit of the first circuit board; and a mating connector that is installed on a second circuit board, is electrically connected to a circuit of the second circuit board, and is electrically connected to the connector, wherein the connector includes a plurality of sets of type 1 contacts disposed in a type 1 holding area, the type 1 contacts being disposed facing each other, and a type 2 contact disposed in each of the two type 2 holding areas sandwiching the type 1 holding area, when viewed from above, at least a portion of each of the type 2 contact is disposed in a range obtained by extending, in a first direction in which the type 1 holding area and the two type 2 holding areas are arranged, a region in which the plurality of sets of type 1 contacts oppose each other in a second direction orthogonal to the first direction, the type 2 contact includes a first connecting portion that is connected to the circuit of the first circuit board, and a first contacting portion that is disposed at a position separated, from the first connecting portion in a normal direction of a disposal surface to the first circuit board, and that contacts a terminal of the mating connector, the mating connector includes a first contact that contacts the type 1 contacts and a second contact that contacts the type 2 contact, the second contact including a second connecting portion connected to the second circuit board and a second contacting portion disposed at a position separated from the second connecting portion in a normal direction of an installation surface to the second circuit board and contacting the type 2 contact, when viewed from above, all of the type 1 contacts and all of the type 2 contacts are disposed having point symmetry with respect to one predetermined point, and the connecting portion and the contacting portion are disposed having point symmetry with respect to the one predetermined point, and the connecting portion is disposed on an extended line of a center line of the set of type 1 contacts that oppose each other.

17. The connector according to claim 4, wherein when viewed from above, all of the type 1 contacts and all of the type 2 contacts are disposed having point symmetry with respect to one predetermined point.

18. The connector according to claim 17, wherein the one predetermined point is disposed inward of an outer edge of the type 1 holding area.

19. The connector according to claim 1, wherein the contacting portion is disposed in the second direction with line symmetry, having an extended line of a center line of the set of type 1 contacts as an axis of symmetry.

20. A connector that is installed on a circuit board and that is electrically connected to a circuit of the circuit board, the connector comprising:

a set of type 1 contacts that is disposed in a type 1 holding area, the type 1 contacts being disposed facing each other; and a type 2 contact that is disposed in each of two type 2 holding areas that sandwich the type 1 holding area, wherein when viewed from above, at least a portion of each of the type 2 contact is disposed in a range obtained by extending, in a first direction in which the type 1 holding area and the two type 2 holding areas are arranged, a region in which the set of type 1 contacts oppose each other in a second direction orthogonal to the first direction, each of the type 2 contact includes a connecting portion that is connected to the circuit of the circuit board, and a contacting portion that is disposed at a position separated from the connecting portion in a normal direction of an installation surface to the circuit board, and that contacts a terminal of a mating connector, when viewed from above, all of the type 1 contacts and all of the type 2 contacts are disposed having point symmetry with respect to one predetermined point, the connecting portion and the contacting portion are disposed having point symmetry with respect to the one predetermined point, and the connecting portion is disposed on an extended line of a center line of the set of type 1 contacts that oppose each other, the center line passing through the one predetermined point, the connecting portion has a connecting surface facing a main surface of the circuit board, and the connecting portion is connected to the circuit board via the connecting surface disposed on the main surface.

21. A connector that is installed on a circuit board and that is electrically connected to a circuit of the circuit board, the connector comprising:

a set of type 1 contacts that is disposed in a type 1 holding area, the type 1 contacts being disposed facing each other; and a type 2 contact that is disposed in each of two type 2 holding areas that sandwich the type 1 holding area, wherein when viewed from above, at least a portion of each of the type 2 contact is disposed in a range obtained by extending, in a first direction in which the type 1 holding area and the two type 2 holding areas are arranged, a region in which the set of type 1 contacts oppose each other in a second direction orthogonal to the first direction, each of the type 2 contact includes a connecting portion that is connected to the circuit of the circuit board, and a contacting portion that is disposed at a position separated from the connecting portion in a normal direction of an installation surface to the circuit board, and that contacts a terminal of a mating connector, the connecting portion and the contacting portion are disposed in the second direction with line symmetry, having an extended line of a center line of the set of type 1 contacts as an axis of symmetry, and the connecting portion is disposed on the extended line, the connecting portion has a connecting surface facing a main surface of the circuit board, and the connecting portion is connected to the circuit board via the connecting surface disposed on the main surface.

22. A connector that is installed on a circuit board and that is electrically connected to a circuit of the circuit board, the connector comprising:

a set of type 1 contacts that is disposed in a type 1 holding area, the type 1 contacts being disposed facing each other; and a type 2 contact that is disposed in each of two type 2 holding areas that sandwich the type 1 holding area, wherein when viewed from above, at least a portion of each of the type 2 contact is disposed in a range obtained by extending, in a first direction in which the type 1 holding area and the two type 2 holding areas are arranged, a region in which the set of type 1 contacts oppose each other in a second direction orthogonal to the first direction, each of the type 2 contact includes a connecting portion that is connected to the circuit of the circuit board, and a contacting portion that is disposed at a position separated from the connecting portion in a normal direction of an installation surface to the circuit board, and that contacts a terminal of a mating connector, when viewed from above, all of the type 1 contacts and all of the type 2 contacts are disposed having point symmetry with respect to one predetermined point, the connecting portion and the contacting portion are disposed having point symmetry with respect to the one predetermined point, and the connecting portion is disposed on an extended line of a center line of the set of type 1 contacts that oppose each other, the center line passing through the one predetermined point, the contacting portion includes a first arm and a second arm that are formed with line symmetry with respect to the extended line from the connecting portion, and the first arm and the second define a space therebetween where the connecting portion of the connector is connectable to the terminal of the mating connector.

23. A connector that is installed on a circuit board and that is electrically connected to a circuit of the circuit board, the connector comprising:

a set of type 1 contacts that is disposed in a type 1 holding area, the type 1 contacts being disposed facing each other; and a type 2 contact that is disposed in each of two type 2 holding areas that sandwich the type 1 holding area, wherein when viewed from above, at least a portion of each of the type 2 contact is disposed in a range obtained by extending, in a first direction in which the type 1 holding area and the two type 2 holding areas are arranged, a region in which the set of type 1 contacts oppose each other in a second direction orthogonal to the first direction, each of the type 2 contact includes a connecting portion that is connected to the circuit of the circuit board, and a contacting portion that is disposed at a position separated from the connecting portion in a normal direction of an installation surface to the circuit board, and that contacts a terminal of a mating connector, the connecting portion and the contacting portion are disposed in the second direction with line symmetry, having an extended line of a center line of the set of type 1 contacts as an axis of symmetry, and the connecting portion is disposed on the extended line, the contacting portion includes a first arm and a second arm that are formed with line symmetry with respect to the extended line from the connecting portion, and the first arm and the second define a space therebetween where the connecting portion of the connector is connectable to the terminal of the mating connector.

24. The connector according to claim 22, wherein the first arm and the second arm project from the connecting portion toward the mating connector, and portions near tips of the first arm and the second arm approach each other and curve toward the connecting portion.

25. The connector according to claim 22, wherein the first arm and the second arm project from the connecting portion toward the mating connector, upper portions of the first arm and the second arm curve in a direction approaching each other, and portions near tips of the first arm and the second arm curve in a direction away from each other.

26. The connector according to claim 22, wherein the first arm and the second arm project from a base that is provided upright on the connecting portion toward the mating connector, portions near tips of the first arm and the second arm approach each other and curve toward the connecting portion, and a plurality of engaged portions with which the type 2 contact engages is provided is provided to the base.

* * * * *